United States Patent
Tan et al.

(10) Patent No.: US 7,460,485 B2
(45) Date of Patent: Dec. 2, 2008

(54) METHODS FOR PERFORMING MEDIUM DEDICATION IN ORDER TO ENSURE THE QUALITY OF SERVICE FOR DELIVERING REAL-TIME DATA ACROSS WIRELESS NETWORK

(75) Inventors: Pek Yew Tan, Singapore (SG); Wei Lih Lim, Singapore (SG); Yasuo Harada, Kobe (JP); Chalermphol Apichaichalermwongse, Kadoma (JP); Kazuhiro Ando, Hirakata (JP)

(73) Assignee: Panasonic Corporation, Osaka (JP)

( * ) Notice: Subject to any disclaimer, the term of this patent is extended or adjusted under 35 U.S.C. 154(b) by 884 days.

(21) Appl. No.: 10/654,901

(22) Filed: Sep. 5, 2003

(65) Prior Publication Data

US 2005/0190771 A1 Sep. 1, 2005

(30) Foreign Application Priority Data

Sep. 6, 2002 (JP) ............................ P2002-261481

(51) Int. Cl.
*H04J 1/16* (2006.01)

(52) U.S. Cl. ........................ 370/252; 370/468; 370/477

(58) Field of Classification Search ................. 370/229, 370/230, 230.1, 235, 395.21, 395.4, 395.41, 370/395.42, 411, 412
See application file for complete search history.

(56) References Cited

U.S. PATENT DOCUMENTS

| | | | |
|---|---|---|---|
| 6,067,287 A * | 5/2000 | Chung-Ju et al. | 370/232 |
| 6,483,839 B1 * | 11/2002 | Gemar et al. | 370/395.42 |
| 6,631,122 B1 | 10/2003 | Arunachalam et al. | |
| 6,754,179 B1 * | 6/2004 | Lin | 370/235 |
| 7,167,723 B2 * | 1/2007 | Zhang | 455/554.2 |
| 2002/0131397 A1 * | 9/2002 | Patel et al. | 370/349 |
| 2002/0141446 A1 * | 10/2002 | Koga | 370/468 |
| 2003/0026290 A1 * | 2/2003 | Umayabashi | 370/468 |
| 2003/0185224 A1 * | 10/2003 | Ramanan et al. | 370/412 |
| 2004/0017825 A1 * | 1/2004 | Stanwood et al. | 370/468 |

OTHER PUBLICATIONS

G. Bianchi et al., "A programmable MAC", Universal Personal Communications 1998, ICUPC '98, from the IEEE 1998 International Conference on Florence, Italy, Oct. 5-9, 1998, pp. 953-957.

* cited by examiner

*Primary Examiner*—Ricky Ngo
*Assistant Examiner*—Kan Yuen
(74) *Attorney, Agent, or Firm*—Greenblum & Bernstein, P.L.C.

(57) ABSTRACT

The presented invention provides methods and apparatus to generate a efficient medium dedication schedule which give wireless medium the ability to serve real-time and non real-time application concurrently and still be able to maintain the QoS as requested by real-time application. Furthermore, it also presents methods for implementing buffer in an efficient matter in order to complement the advantage introduced by burst transmission and burst acknowledgement.

18 Claims, 21 Drawing Sheets

Fig.3

| GENERIC SPECIFICATION | CBR REAL-TIME STREAMING APP. | VBR REAL-TIME STREAMING APP. | CBR REAL-TIME BLOCK TRANSFER APP. | VBR REAL-TIME BLOCK TRANSFER APP. |
|---|---|---|---|---|
| DATA RATE LOWEST BOUND | AVERAGE BANDWIDTH | | BANDWIDTH REQUIRED INTO TO SATISFY THE DELAY REQUIREMENT OF EACH DATA BLOCK | |
| DATA RATE HIGHEST BOUND | AVERAGE BANDWIDTH + EXTRA BANDWIDTH FOR ERROR RATE | PEAK BANDWIDTH + EXTRA BANDWIDTH FOR ERROR RATE | BANDWIDTH REQUIRED TO CONSIDER FOR ERROR RATE | |
| TRANSMISSION RATE | TRANSMISSION RATE THAT IS USED TO TRANSMIT THE TRAFFIC | | | |
| NOMINAL DATA SIZE | BASIC DATA INPUT UNIT | | | |
| DELAY BOUND | ACCEPTABLE MAXIMUM DELAY TOLERANCE OF A DATA UNIT | | | |
| JITTER BOUND | ACCEPTABLE MAXIMUM DELAY VARIATION | | NOT APPLICABLE | | ized by like reference numeral,
METHODS FOR PERFORMING MEDIUM DEDICATION IN ORDER TO ENSURE THE QUALITY OF SERVICE FOR DELIVERING REAL-TIME DATA ACROSS WIRELESS NETWORK

BACKGROUND OF THE INVENTION

1. Field of the Invention

This invention is related to deliver time sensitive data, such as real-time Audio-Visual data for interactive applications, communicative applications and gaming, across an erroneous transmission medium. In order to meet the Quality of Service, data traffic need to be coordinated and scheduling of bandwidth dedication need to be performed.

2. Background and Prior Art

In prior art, medium dedication is being performed according to traffic requirement only. Transmission medium requirement and error condition are usually not being considered.

To deliver real-time data across wireless network, medium dedication must be performed. Due to the erroneous condition of the medium and variety of traffic requirement, medium dedication should be adaptive and anticipative to medium condition as well as instantaneous request and feedback.

SUMMARY OF THE INVENTION

The invention solves the problems by providing a systematic way to perform medium dedication; a means to transform traffic requirement into a form of specification that can incorporate the medium condition; a means to aggregate the specification to reduce overhead incurred; a means to merge individual medium dedication schedule for each stream into a unified medium dedication schedule; a means to perform medium dedication; a means to perform adaptation in order to tune specification to be more reliable and a means to perform monitoring and reporting of medium condition.

By applying the present invention, real-time delivery of multiple streams can be efficiently realized with a unified medium dedication schedule. This present invention also provides methods to convert traffic requirement specification into a form a specification that can be incorporated with error condition. Furthermore this specification can be aggregated in order to reduce overhead incurred.

BRIEF DESCRIPTION OF THE DRAWINGS

The present invention will become readily understood from the following description of preferred embodiments thereof made with reference to the accompanying drawings, in which like parts are designated by like reference numeral, and in which:

FIG. 3 is a table of mapping of real-time application requirement to generic requirement representation;

DETAILED DESCRIPTION OF THE PREFERRED EMBODIMENTS

With the present invention, Traffic Requirement Specification for a real-time data streams is being generated by the entity with the best knowledge of the characteristic of the stream. With the Traffic Requirement Specification, it is being transformed into Medium Occupancy Specification, which is in the form that describes the requirement of the stream with the consideration of the transmission medium overhead and condition. Due to the nature of Medium Occupancy Specification, it can be aggregated. Medium Specification is being used as input to the scheduler for generation of Medium Dedication Schedule. Scheduling is being performed periodically. During each scheduling process, all the Medium Occupancy Specification are being adjusted according to modification or transmission medium status feedback that are being received during the previous scheduling period. After the adjustment, all the Medium Occupancy Specifications are being sorted in the ascending order according to the value of dedication interval required. In the other words, Medium Occupancy Specification that required to be given medium dedication more frequent is in the front of the list. Furthermore, for each of the Medium Occupancy Specification, the number of medium dedication required for this specification within the schedule period, the medium dedication duration for each medium dedication instance and the medium dedication start time are to be computed. With all these, Medium Dedication Schedule can be obtained and bandwidth allocation is being performed.

Embodiments

In the following description, for purpose of explanation, specific numbers, times, structures, and other parameters are set forth in order to provide a thorough understanding of the present invention. The following paragraphs give an exemplification of how the invention can be implemented. However, it will be apparent to anyone skilled in the art that the present invention may be practiced without these specific details.

Figure 1:
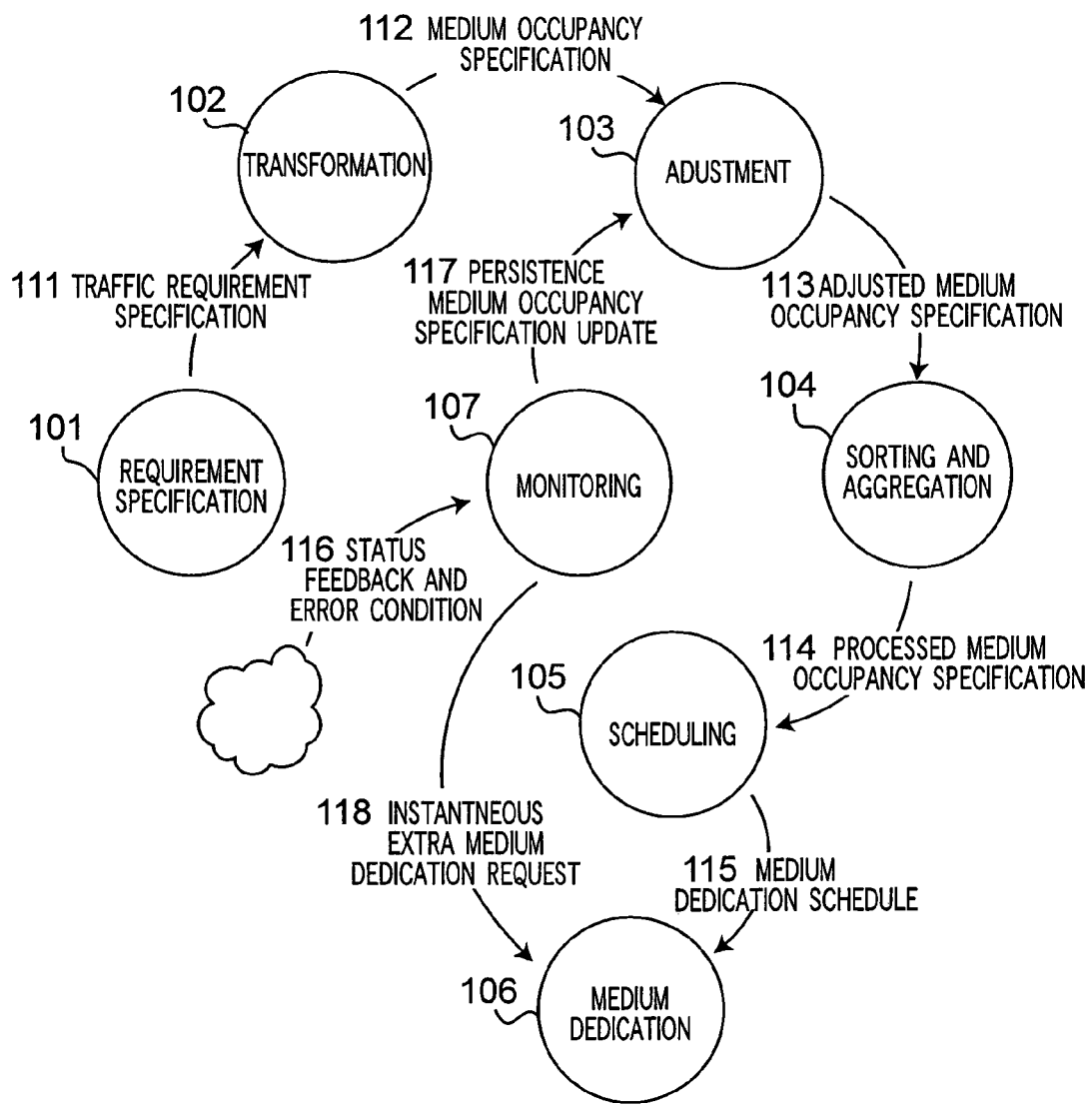
FIG. 1 is a schematic view of a systematic process for Medium Dedication Schedule Generation.
Figure 2:
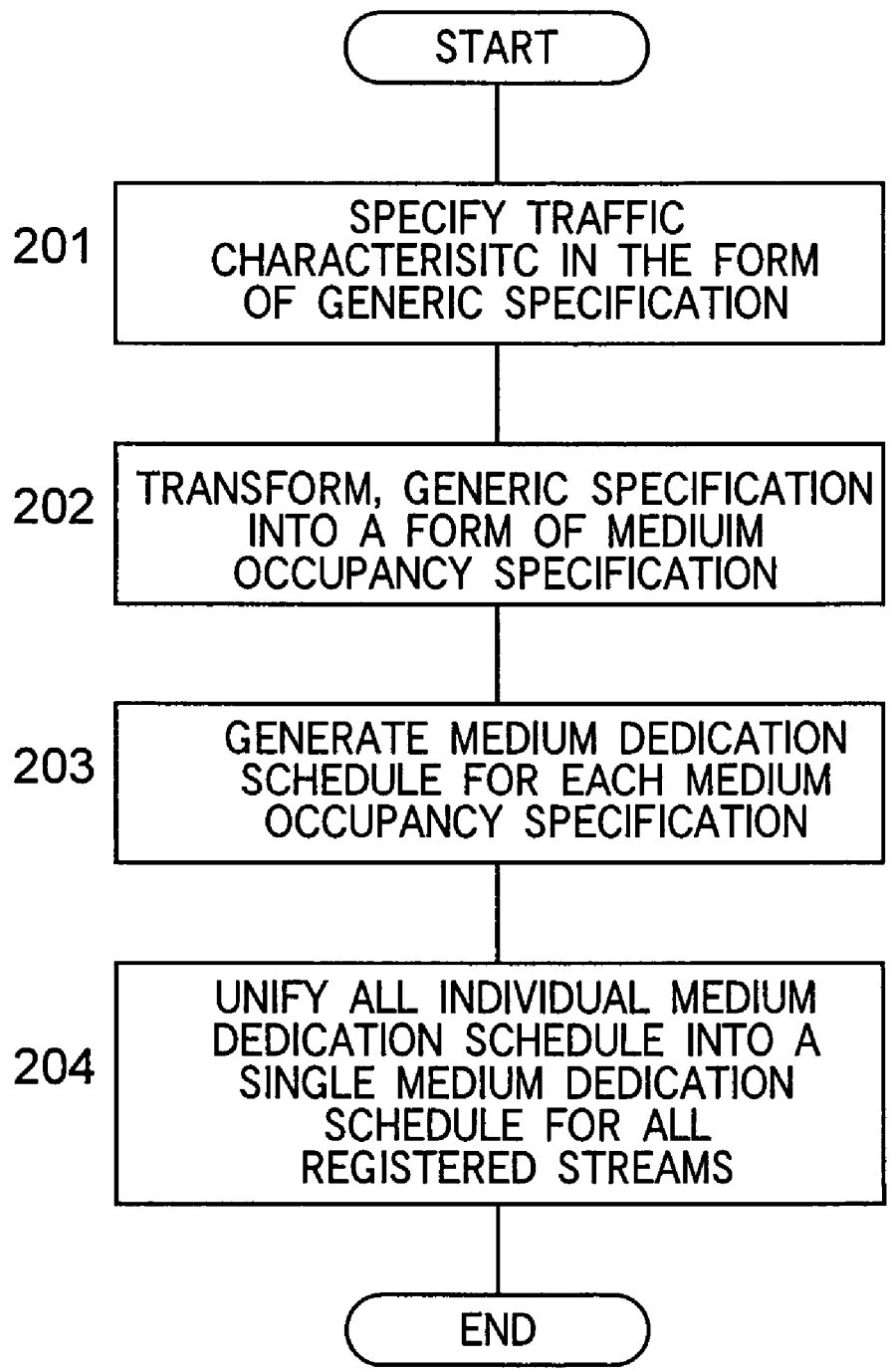
FIG. 2 is a flowchart of the systematic process.

To stream multiple timely applications data across erroneous transmission medium, bandwidth should be coordinated and dedicated. Furthermore, all these dedication should be adaptive and anticipative to medium condition as well as corrective action and schedule adjustment should be responsive to instantaneous request and status feedback. A shown in FIG. 1 is a systematic process used to achieve QoS Requirement of the conformance streams that are being delivered through an erroneous transmission medium. This flow of processes includes Requirement Specification (101), Transformation (102), Adjustment (103), Sorting and Aggregation (104), Scheduling (105), Medium Dedication (106) and Monitoring (107). FIG. 2 is a flowchart of the systematic process. In brief, as shown in FIG. 2, the process start by specifying traffic characteristic in the form of a generic specification (201), which is being transform into another from of specification (202). Hereby we name this form of specification as Medium Occupancy Specification. This form of specification is being processed and used as input to scheduling process. During the scheduling process, Medium Dedication Schedule is being generated for each Medium Occupancy Specification (203), which is then being merged into a Unified Medium Dedication Schedule (204).

Applications required network delivery could be classified into three classes, such as CBR or VBR real-time streaming applications, CBR or VBR real-time block transfer applications and Non-real-time applications. Non-real-time application data are usually being served at the lowest priority using the remaining bandwidth of the network. As for real-time streaming applications and real-time block transfer applications, they deliver time-based information in real-time. To guarantee the QoS of these applications, substantial bandwidth must be dedicated.

In the Requirement Specification process (101), the requirement of the traffic stream from any type of real-time applications is being expressed in a generic parameterized form, which is being specified by the entity with the best knowledge of the stream. An example of these parameters is shown as element in the following structure:

```
Structure Traffic Requirement Specification {
    Data Rate Highest Bound
    Data Rate Lowest Bound
    Nominal Data Size
    Delay Bound
    Jitter Bound
    Transmission Rate
}
```

However, it will be apparent to anyone skilled in the art that elements in the structure can be expanded or omitted depending on the characteristic of stream. Data Rate Lowest Bound is the bandwidth required to satisfy the minimum data delivery requirement of the traffic stream, which is being measured in the context of that layer defining the Traffic Requirement Specification. Data Rate Highest Bound is to provide more information for the scheduling entity or medium coordinator to generate medium dedication efficiently in order to handle variable bit rate traffic stream and erroneous condition. This is to ensure the medium bandwidth dedicated to resolve erroneous condition is bound to an upper limit and to prevent denial of service due to too much unnecessary bandwidth are being dedicated to a stream that is currently experiencing severe erroneous condition. Nominal Data Size is to indicate the basic data input unit to this layer, which is used to compute the overhead that is being imposed by the packetized medium used for the data delivery. Delay bound is to specify the delay tolerance of the traffic stream or the expiration of the time-based content. Jitter bound is to specify the delay variation tolerance in order to prevent buffer underflow or overflow at the corresponding OSI layer of receiver. Transmission rate is to specify the rate that is used to transmit the traffic stream over the medium. FIG. 3 shows an example of the mapping between real-time application requirements into the generic representation.

In the Transformation process (102), Generic Traffic Requirement Specification (111) is being converted to Medium Occupancy Specification (112). This specification marked by literal (112) is a traffic stream requirement in the form with the consideration of specific requirement, overhead and condition of transmission medium. All the parameters in this specification marked by literal (112) are being expressed in time unit. An example of medium occupancy specification in a structure form is as follow:

```
Structure Medium Occupancy Specification {
    Medium Occupancy Duration Lowest Bound
    Medium Occupancy Duration Highest Bound
    Specification Duration Interval
    Dedication Interval Lowest Bound
    Dedication Interval Highest Bound
}
```

Figure 4:
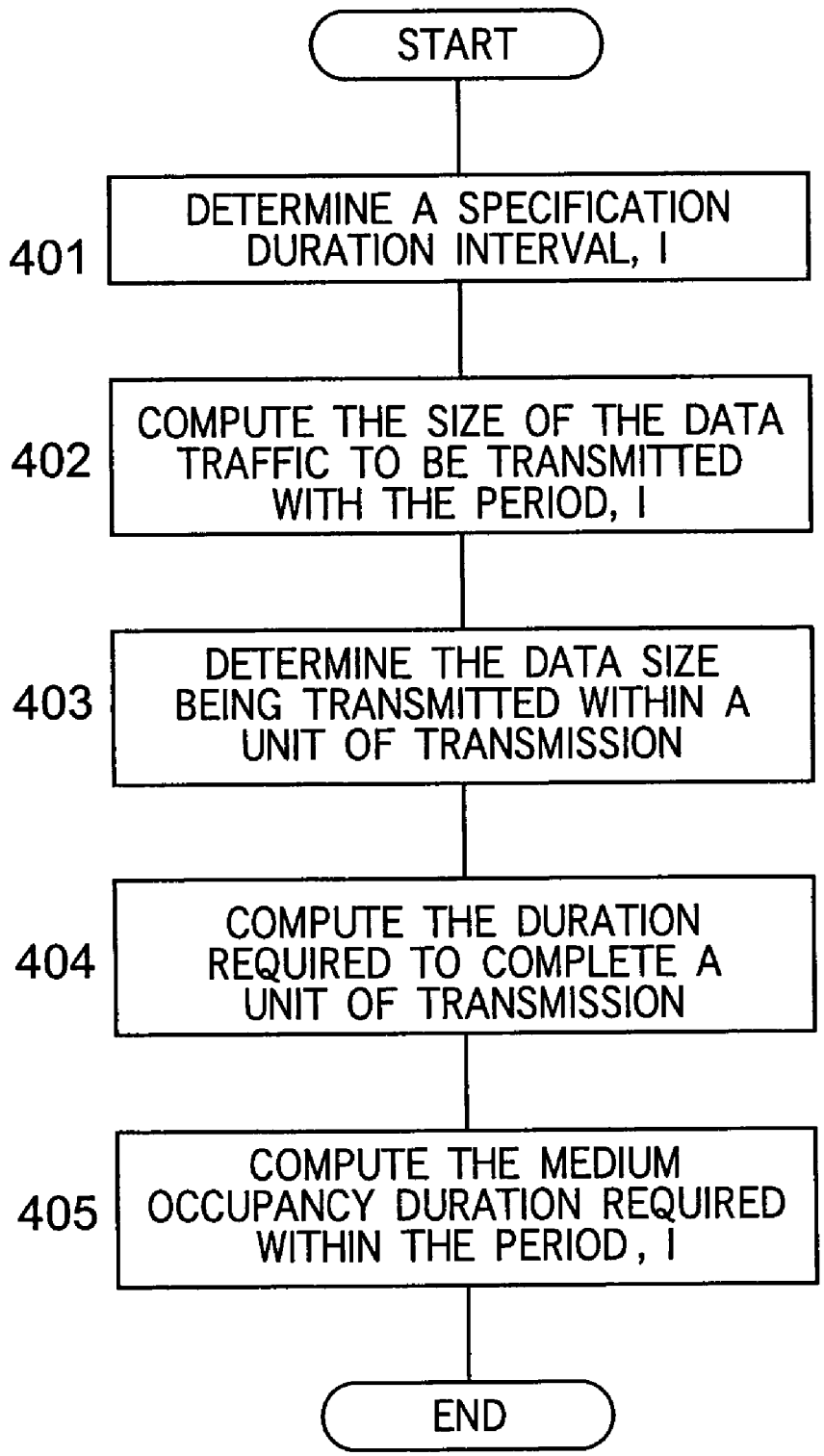
FIG. 4 is a flowchart for transforming data rate required into medium occupancy duration.

FIG. 4 is an flowchart to transform data rate required into medium occupancy duration. Specification Duration Interval is to be determined by the entity that performs the transformation (401). To compute Medium Occupancy Duration, the total size of the stream that required to be transmitted within Specification Duration Interval (402) and the total size of data can be transmitted in a transmission unit (403) are to be determine. In addition to, the duration required to complete a transmission unit and the duration to obtain acknowledgement for those data being transmitted in the burst are also need to be determined (404). Then, Medium Occupancy Duration Lowest and Highest Bound can be computed base on Data Rate Lowest and Highest Bound correspondingly. The following is an example of the transformation with the input in the form of Traffic Specification Requirement example as given above:

$$T_{min} = \frac{R*I}{N*S}*L,$$

where
R=Data Rate Lowest Bound or Data Rate Highest Bound;
I=Specification Duration Interval;
S=Nominal MSDU Size;
N=Number of data unit being transmitted in a burst; and
L=Duration needed to transmit the burst that consist of N data unit at Transmission Rate plus the duration needed to obtain acknowledgement.

R*I is to compute the size of the data traffic to be transmitted within a Specification Duration Interval. N*S is to compute the size of data traffic being transmitted in a unit of transmission burst.

Next step, Medium Allocation is being performed in order to determine Dedication Interval Lowest and Highest Bound Dedication Interval Lowest and Highest Bound are to be determined base on Delay Bound and Jitter Bound with the following two constraints. The first constraint is the Dedication Interval Highest Bound should be bound by Delay Bound. The second is the different between Dedication Interval Highest Bound and Dedication Interval Lowest Bound should be bound by Jitter Bound. If more than one medium dedication is being performed within a Delay Bound then the sum of dedication interval variation should be bound by jitter bound. To determine the value for Dedication Interval Highest Bound and Dedication Interval Lowest Bound, dedication interval for this Medium Occupancy Specification is to be computed. First is to compute NP the number of polls required within the Specification Duration Interval with the consideration of the medium dedication duration limit (1103), which is equal to the smallest integer that is greater than the division result of the result from the operation marked by literal 1102 over medium dedication duration limit for an instance of medium dedication. With that, Dedication Interval can be determined by division result of Specification Duration Interval over the result from the operation marked by literal 1103. After that, compute the scaling factor from Delay Bound to Dedication Interval (1106). With the scaling factor, scale the Jitter Bound to a new value, G (1107). Then, Dedication Interval Highest Bound is equal to Dedication Interval+G/2 and Dedication Interval Lowest Bound is equal to Dedication Interval−G/2. Jitter Bound may not available for the specification due to the requirement or characteristic of the stream. In this case, Dedication Interval Highest Bound is equal to Dedication Interval and Dedication Interval Lowest Bound is equal to zero.

Medium Occupancy Specification for multiple traffic streams that are transmitted by the same entity can be aggregated into a single specification. This aggregation is to reduce resources required to maintain and process the specification as well as overhead incurred during medium dedication. Then, it is being used as an input to Adjustment Process (103), which tunes the specification to best fit the transmission medium condition by using the information gathered by the monitoring process. With this Adjustment process, medium occupancy specification can become more reliable to be used by scheduler to generate medium dedication schedule in order to achieve the QOS requirement of traffic stream.

Figure 5:
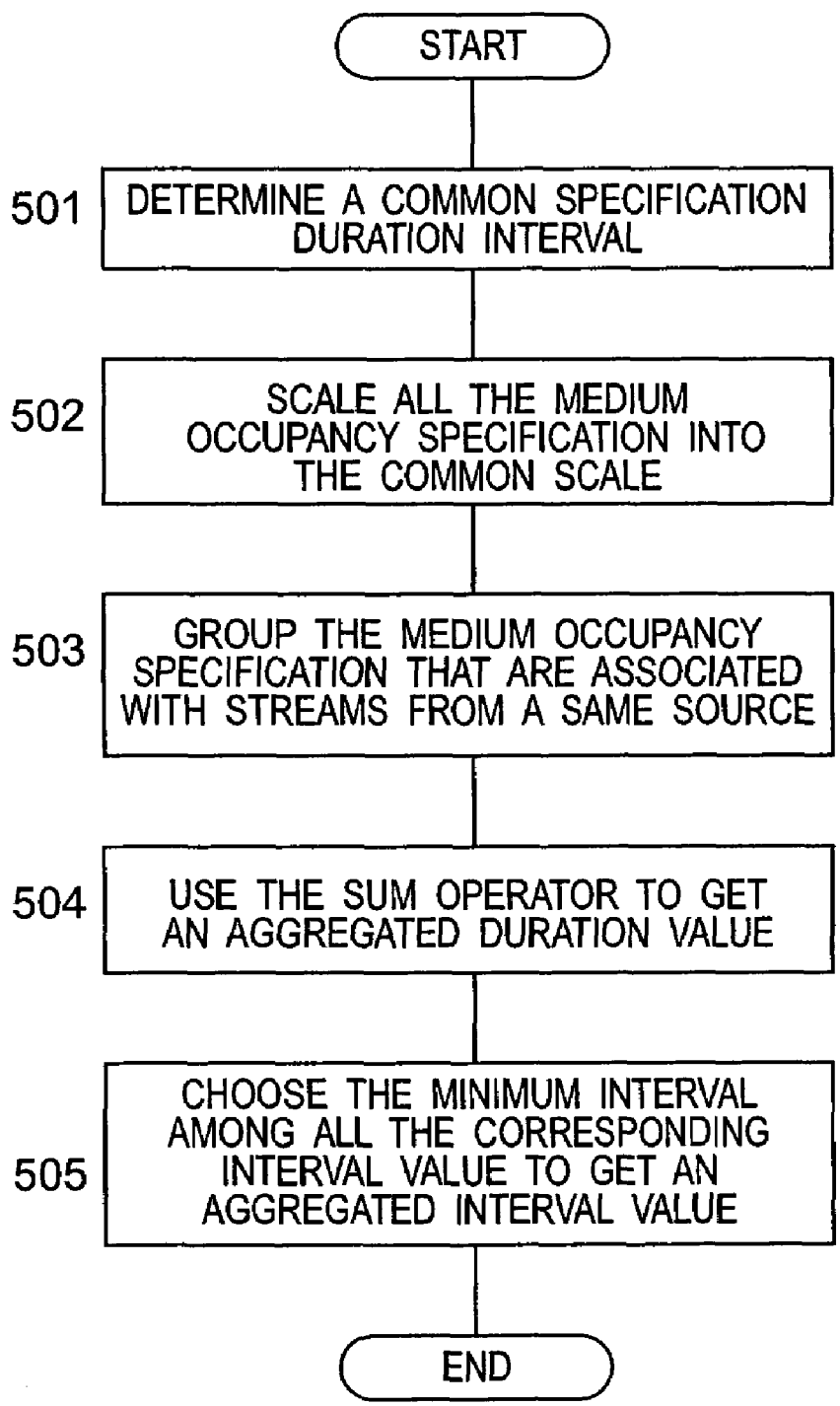
FIG. 5 is a flowchart of the process to aggregate medium occupancy specification.

In the Sort and Aggregation Process (104) as shown in FIG. 1, all the Medium Occupancy Specifications are being sorted and aggregated according to the identification of the device that the medium dedication is going to be dedicated. FIG. 5 is an flowchart for the process to aggregate medium occupancy specification. Initially, a common Specification Duration Interval is determined (501). In this process, using the Medium Occupancy Specification example as mentioned above, all the Medium Occupancy Specifications are being scaled to a common specification duration interval (502) and then sorted and grouped according to the identification of the device that the medium dedication is going to be dedicated (503). For each aggregation, sum the corresponding parameters of Medium Occupancy Specification that are related to medium occupancy duration (504), such as Medium Occupancy Duration Lowest Bound or Medium Occupancy Duration Highest Bound. As for dedication interval, such as Dedication Interval Lowest Bound or Dedication Interval Highest Bound, the minimum is being selected (505). Then, all the aggregated Medium Occupancy Specifications are being sorted once more using the different between the highest and lowest bound of Dedication Interval, which is Dedication Interval variation, as key in ascending order.

Figure 6:
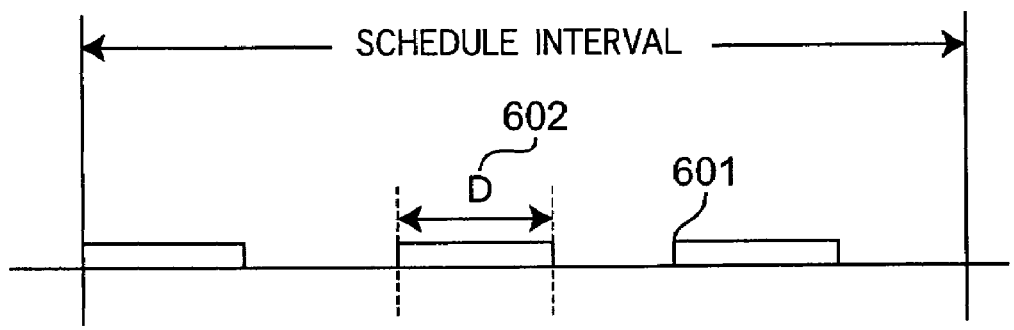
FIG. 6 is a schematic view of Medium Dedication Schedule.
Figure 7:
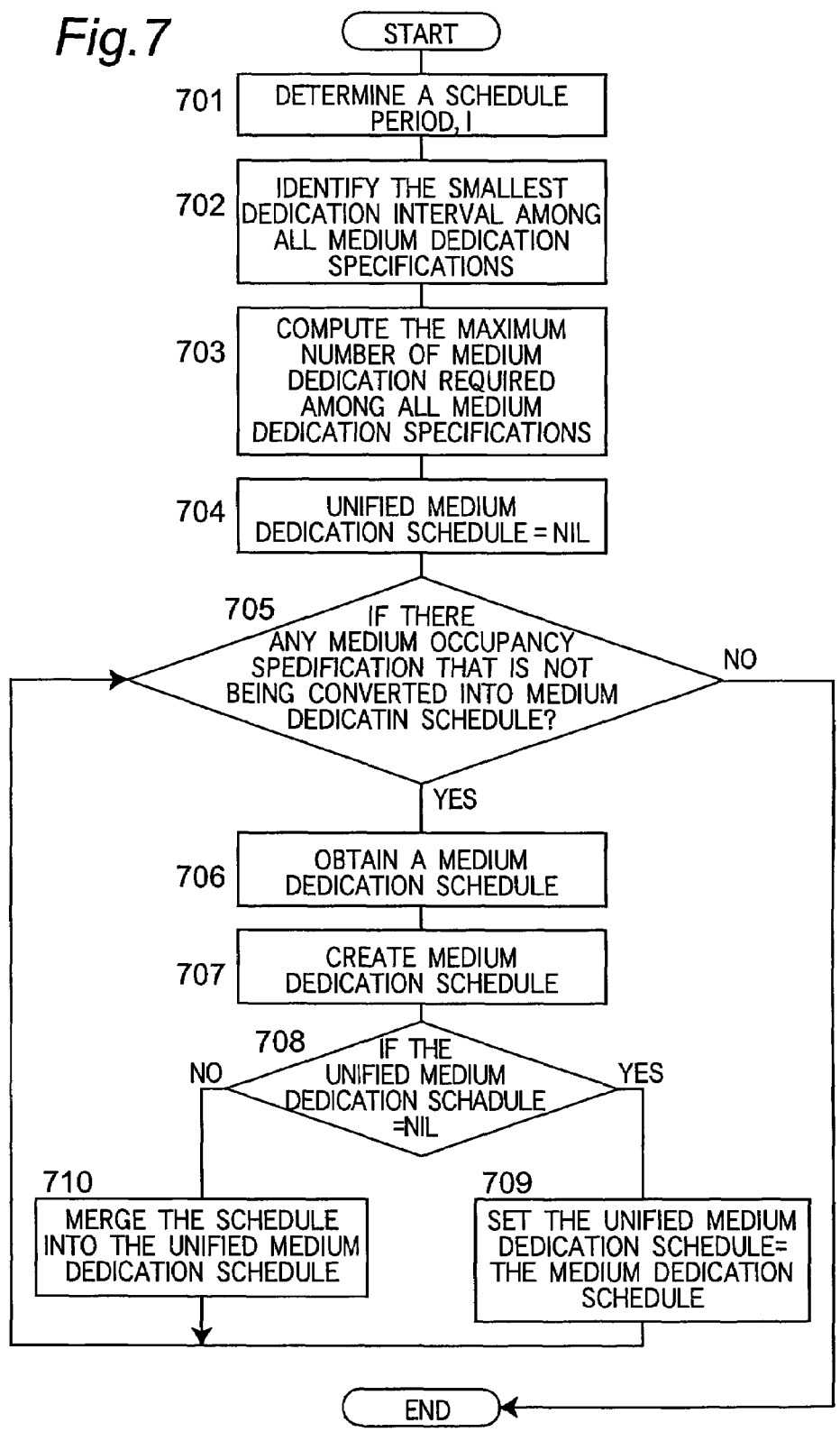
FIG. 7 is a schematic view of the process to generate an unified Medium Dedication Schedule.
Figure 8:
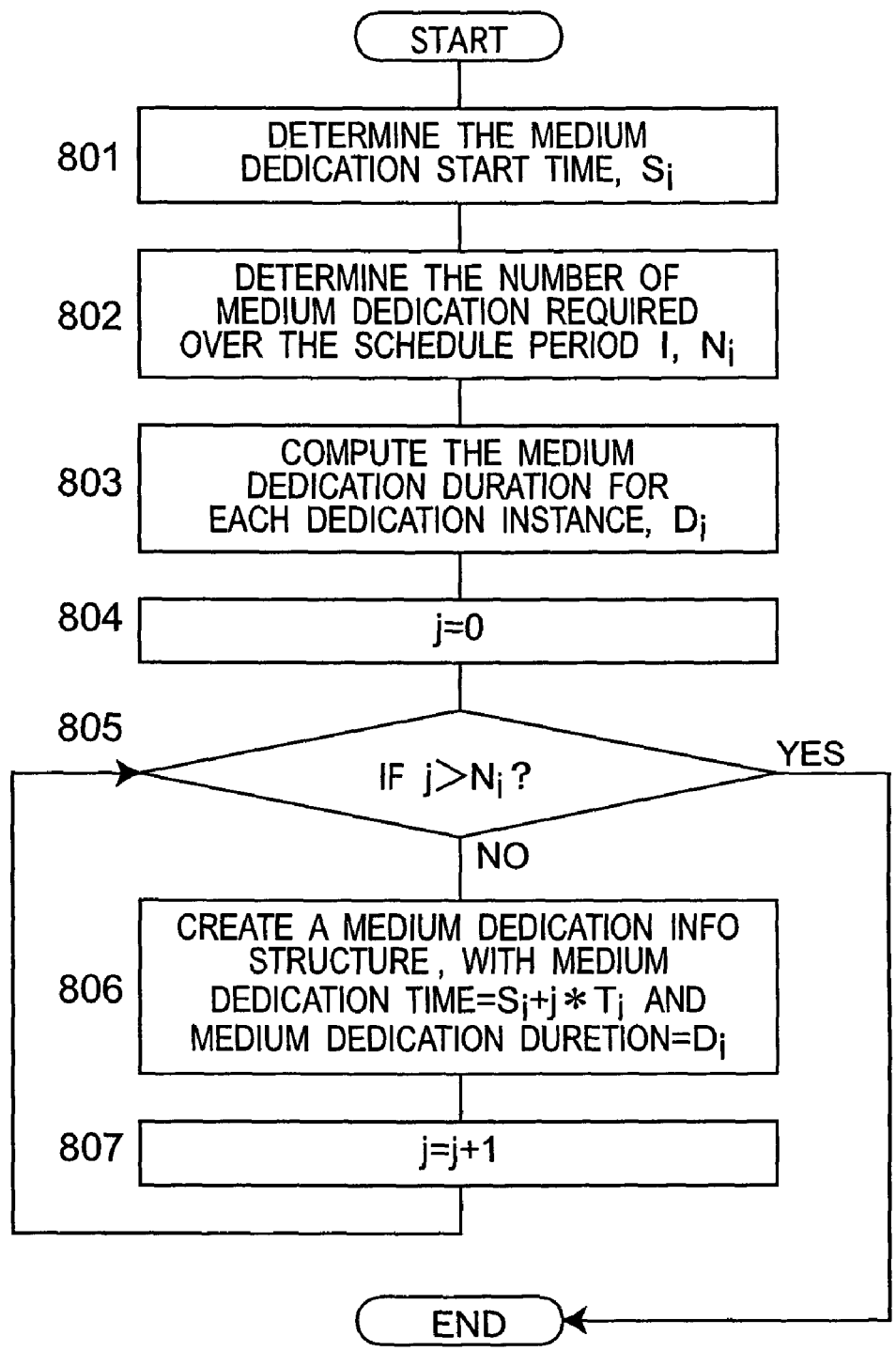
FIG. 8 is a flowchart of the process for creating a Medium Dedication Schedule for a Medium Occupancy Specification.

In the Scheduling Process (105), the sorted and aggregated Medium Occupancy Specifications (114) are being used to generate Medium Dedication Schedule (115). FIG. 6 is a schematic view of Medium Dedication Schedule. FIG. 7 is a schematic view of the process to generate an unified Medium Dedication Schedule. FIG. 8 is a flowchart of the process for creating a Medium Dedication Schedule for a Medium Occupancy Specification. First, obtain the smallest dedication interval, P (702), which is the smallest among all the Medium Occupancy Specifications. Then compute the maximum number of medium dedication required, $N_{max}$ (703), which is equal to the smallest non-prime integer value that is greater than or equal to the division result of specification duration interval over smallest dedication interval, P. For each sorted and aggregated Medium Occupancy Specification, the number of medium dedication required for this specification within the schedule period, Ni (802), medium dedication duration for each dedication instance, Di (803) and the medium dedication start time, Si (801) are being computed for each round of Medium Dedication Schedule generation. Medium Dedication Schedule is a list of Medium Dedication Info. An example of Medium Dedication Info in structure form is as follow:

Structure Medium Dedication Info {
    Device ID
    Medium Dedication Time
    Medium Dedication Duration
}

Device ID is the identification of the device that this medium dedication is dedicated. Medium Dedication Time is the time that this medium dedication is dedicated (601). Medium Dedication Duration is the time duration that this medium dedication is dedicated (602). For each Medium Occupancy Specification, a list with Ni number of the structure is formed with Medium Dedication Time being assigned to medium dedication start time plus some factor of dedication interval for the corresponding Medium Occupancy Specification (806). This factor is range from 0 to Ni−1, with each of the value being used for the creation of each structure. As for Medium Dedication Duration, it is equal to Medium Occupancy Duration over the number of medium dedication required, Ni, for the corresponding Medium Occupancy Specification.

Figure 9:
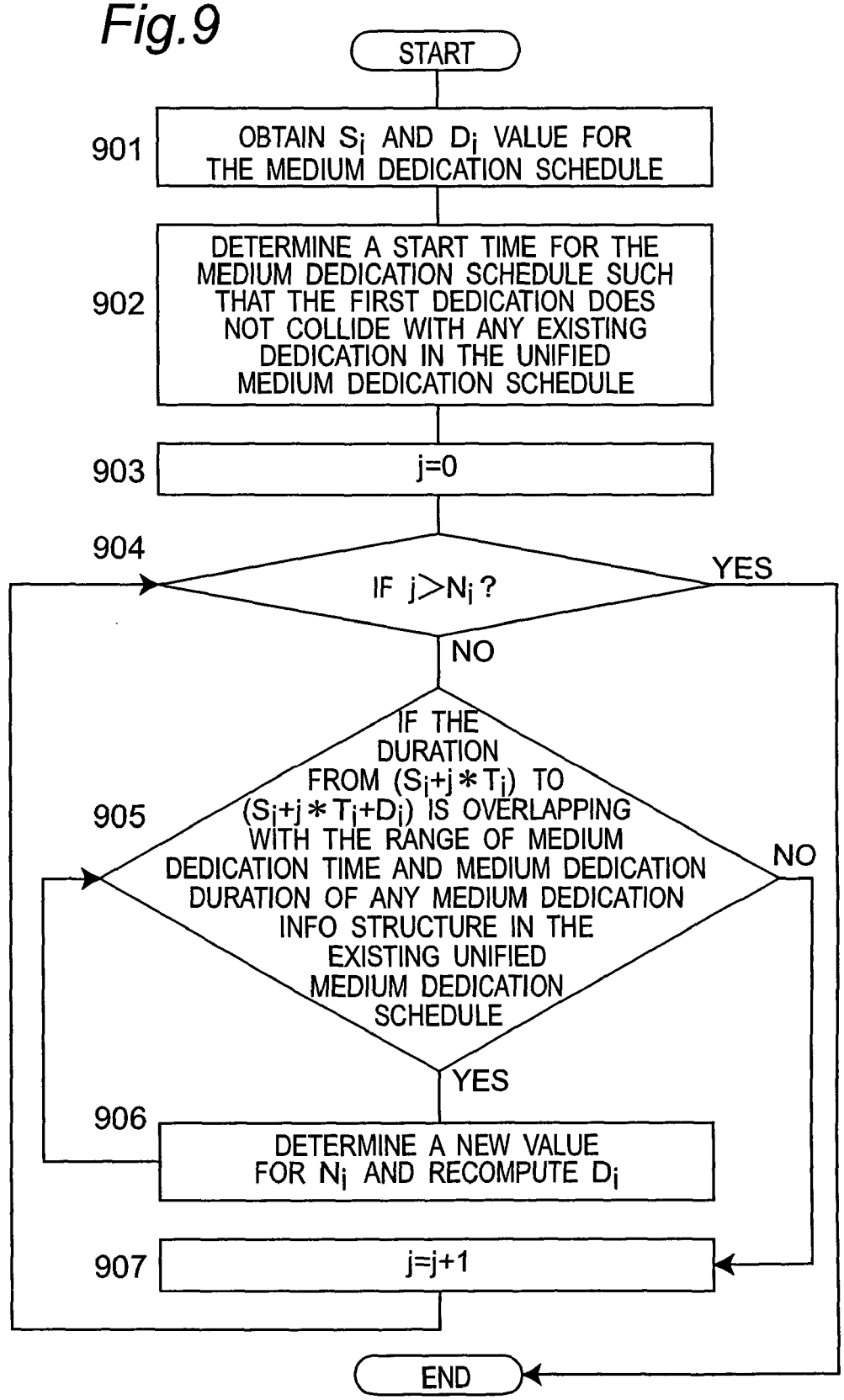
FIG. 9 is a flowchart of the process for merging a Medium Dedication Schedule for a Medium Occupancy Specification into the unified Medium Dedication Schedule.
Figure 10:
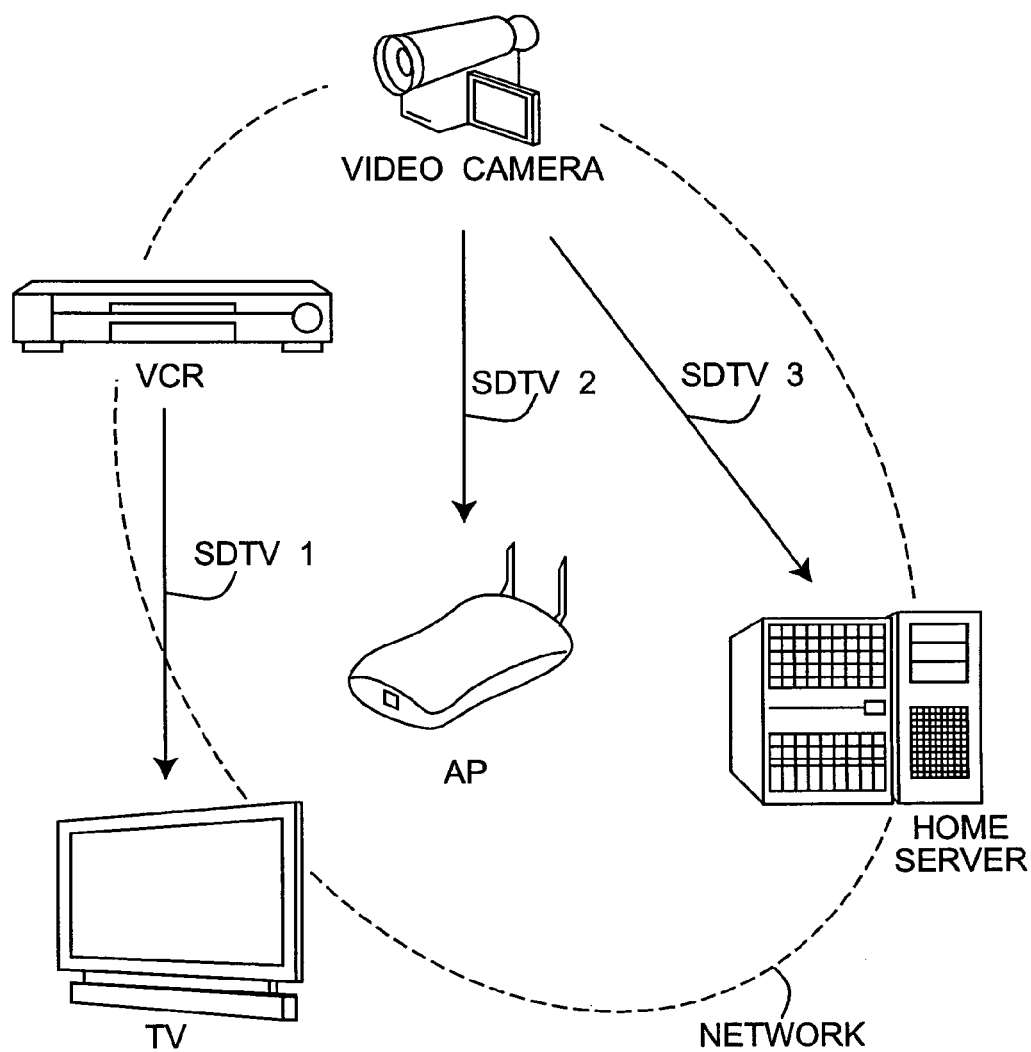
FIG. 10 is a schematic view of a scenario used to illustrate the invention.

FIG. 9 is a flowchart of the process for merging a Medium Dedication Schedule for a Medium Occupancy Specification into the unified Medium Dedication Schedule. Initial value of Ni is the smallest factor of the maximum number of dedication, $N_{max}$ that is greater than or equal to the division result of specification duration interval over dedication interval for this specification. Di is equal to the division result of Medium Occupancy Duration required for this Medium Occupancy Specification over Ni. Initial value of Si is equal to the starting time of this newly generated Medium Dedication Schedule (901). Once all these initial values are being determined, each of the sorted and aggregated Medium Occupancy Specifications are being converted into a form of Medium Dedication Schedule and then merged in the corresponding order to become a single unified Medium Dedication Schedule. During each merging process, Si is being assigned to a time that is not earlier than the initial value, where the new value of Si and (Si+Di) are not within the range of Medium Dedication Time and Medium Dedication Duration of any Medium Dedication Info in the work-in-process unified Medium Dedication Schedule (902). With the new value of Si, if any duration from R=(Si+a*Ti) to W=(Si+a*Ti+Di), where a=1... Ni−1 and Ti=Dedication Interval, is within the range of Medium Dedication Time and Medium Dedication Duration of any Medium Dedication Info in the work-in-process unified Medium Dedication Schedule (905), then new value for Ni and Di are to be determined (906). A possible new value for Ni is the smallest factor of the maximum number of dedication, $N_{max}$ that is greater than old value of Ni. Once the new value of Ni is being determined, new value for Di can be computed. This process is repeated until no overlapping. With the final value of Si, Ni and Di, a list of medium dedication info, which contains Ni number of medium dedication info, is being created and inserted into the work-in-process unified Medium Dedication Schedule. Finally, when all the sorted and aggregated Medium Occupancy Specifications are being processed, a single unified Medium Dedication Schedule that is sorted according to Medium Dedication Time is being produced.

In the Medium Dedication process (106), Medium Dedication Schedule is being used to perform medium dedication. Each Medium Dedication Info for a Medium Dedication Schedule is to be used to generate a Medium Dedication frame, which is to be inserted into a specific queue according to Medium Dedication Time. Frame queued at this specific queue is to be served first at each transmission of the entity. With this, medium dedication can be dedicated on the scheduled time.

Due to transmission medium condition is unpredictable and variable bit rate stream characteristic, Adjustment (103) and Monitoring (107) process are required. In the Monitoring process, transmitting device should monitoring the status of a transmission queue and the transmission medium condition in order to generate report for the entity that is responsible for bandwidth dedication. The transmission queue is a specific queue used to store outgoing data packets for the data stream that is with a type of requirement specification being registered with scheduling entity. The data entering the queue is being rate controlled. By observing the status of the queue at the end of each medium dedication, the condition of the transmission medium and medium dedication can be concluded and report can be generated. This report can be in the form of Medium Occupancy Specification, parameters used to perform adjustment to existing Medium Occupancy Specification or instantaneous request for extra medium dedication. The request for extra medium dedication should be fulfilled if possible at the timely fashion. As an example, this request can be fulfilled using the gap between each medium dedication or the remaining bandwidth that are being returned prematurely from a medium dedication.

Long-term effects reports are being input into Adjustment process to tune the specification and short-term effects reports are being input into medium dedication process to perform instantaneous medium dedicated. For example, medium occupancy specification update generated by monitoring process is being used from next scheduling interval onward to perform scheduling. With these two processes, even for data traffic stream with requirement not able being fully identified by the generic specification and transmitted under unpredictable transmission medium condition can achieve QoS Requirement of the stream.

To achieve better understanding of the invention, a scenario, as shown in FIG. 3, with three SDTV streams are transmitting in the 5 Ghz wireless network using 36 Mbps OFDM PHY is used for illustration. Assuming the bit generation rate of those 3 streams is at 6 Mbps with 30 frames per sec and average frame size is 25 Kbytes. With the consideration of overhead of OSI protocol layers and transmission medium overhead, 6764 µs (as shown in table 1) are required to completely transmit all the packets that are generated from a frame (base on the average frame size).

TABLE 1

Transmission time required for a frame.

| | Values | |
|---|---|---|
| Frame per sec | 30 | |
| AV stream generation bit rate | 6000000 | |
| Frame generation rate | 0.033333 | a |
| Byte per frame | 25000 | |
| No of MPEG-2 TS | 133 | |
| No of MSDU (7 TS per MSDU) | 19 | |
| Transmission time per MSDU (1402 bytes) | 0.000356 | |
| Transmission time required for a frame | 0.0067640 | b |
| Free Time (a−b) | 0.026569 | |
| Bandwidth required at MAC | 6393120 | |

Considering that receiver is keeping the buffer for two frames before start decoding, the following generic specification as shown in table 2 is created for each stream base on table 1 computation.

TABLE 2

Generic Specification for a SDTV stream.

| Generic Specification Parameters | Values | |
|---|---|---|
| Data Rate Lowest Bound | 6393120 | bps |
| Data Rate Highest Bound | 7032432 | bps |
| Nominal Data Size | 1402 | bytes |
| Delay Bound Jitter | 66667 | µs |
| Jitter Bound | 53138 | µs |
| Transmission Rate | 36 | Mbps |

Here, Data Rate Lowest Bound is equal to Bandwidth required at MAC shown in Table 1 which is determined by computer simulation. Delay bound is equal to 2* a (Table 1) and Jitter bound is equal to 2* (a−b) because we assume that the receiver keeps the buffer for two frames before start decoding.

By performing transformation on the generic specification using the method as shown in FIG. 4, Medium Occupancy Specification as shown in table 3 is obtained.

TABLE 3

Medium Occupancy Specification for a SDTV.

| Medium Occupancy Specification | Values | |
|---|---|---|
| Medium Occupancy Duration Lowest Bound | 0.216101 | s* |
| Medium Occupancy Duration Highest Bound | 0.237711 | s* |
| Specification Duration Interval | 1 | s |
| Dedication Interval Lowest Bound | 0.040098 | s |
| Dedication Interval Highest Bound | 0.093236 | s |

Figure 12:
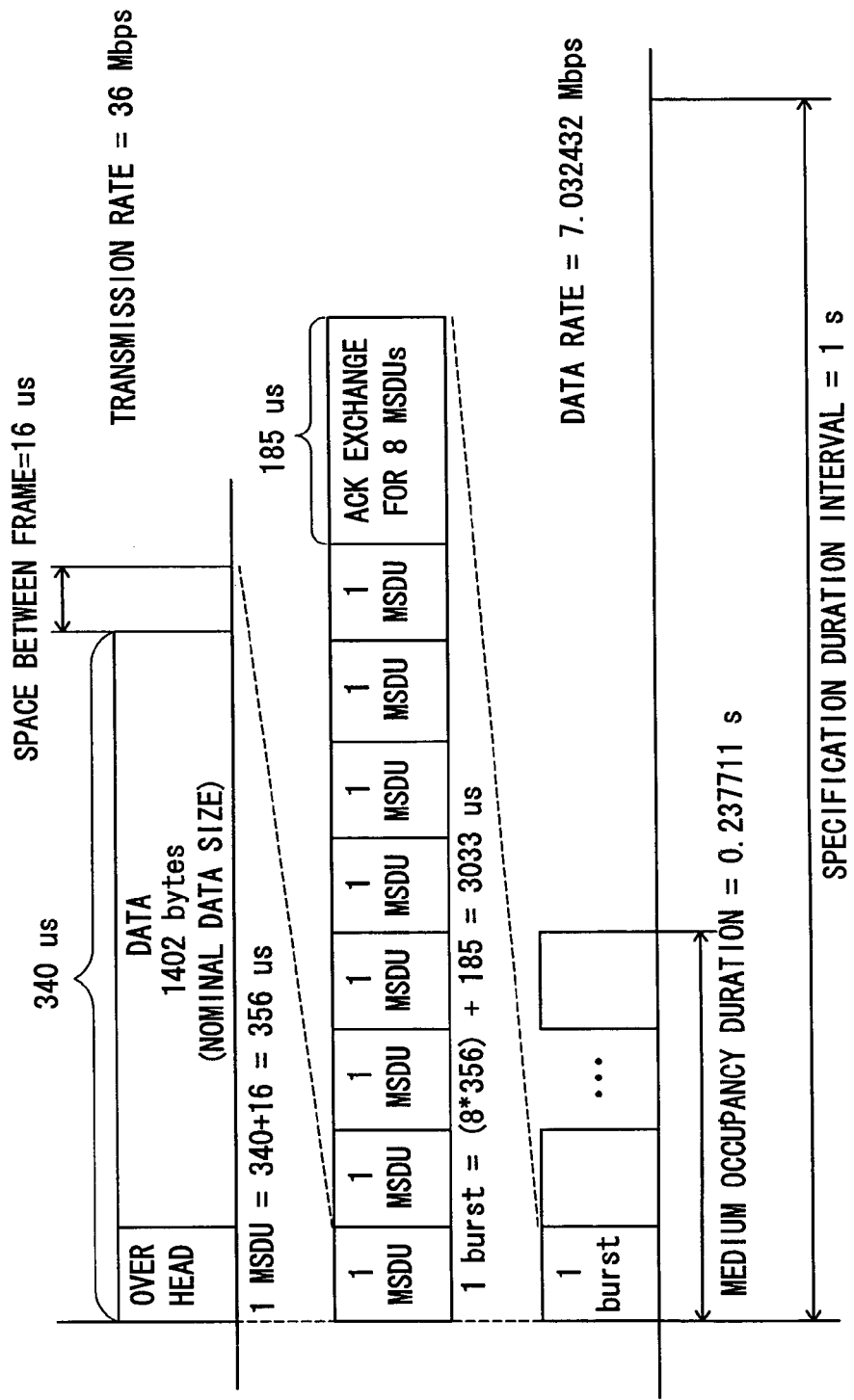
FIG. 12 is a schematic view of Medium Occupancy Duration.

*Base on the transmission duration required to transmit 8 data packets in a burst, which is 3033 µs as shown in FIG. 12.

How to calculate the value for each parameter shown in Table 3 is described below.

Please refer to FIG. 12. A burst transmission in which ACK Exchange is performed every 8 MSDUs is applied. Each MSDU contains data of 1402 bytes. Considering the protocol overhead and the space between frame, time required to transmit a MSDU can be computed by using the transmission rate which is one of the generic specification parameters indicated in Table 2. In this example, we let time required to transmit a MSDU=356 µs time required to perform ACK Exchange every 8 MSDUs=185 µs As a result, a time required to transmit 1 burst (L)=8*356+185=3033 µs.

According to this, $$\text{Medium Occupancy Duration} = T_{min}$$
$$= \frac{R * I}{N * S} * L$$

$$\text{Medium Occupancy Duration Highest Bound} = \frac{7.032432 * 10^6 * 1}{8 * 1402 * 8} * 3033 * 10^{-6}$$
$$= 0.237711 \text{ s}$$

$$\text{Medium Occupancy Duration Lowest Bound} = \frac{6.393120 * 10^6 * 1}{8 * 1402 * 8} * 3033 * 10^{-6}$$
$$= 0.216101 \text{ s}$$

At this step medium allocation is not being performed, Dedication interval Highest/Lowest bound can be computed as below.

$$\text{Dedication Interval Highest bound} = \text{Delay bound} + \text{Jitter bond}/2$$
$$= 0.066667 + 0.053138/2$$
$$= 0.093236 \text{ s}$$

$$\text{Dedication Interval Lowest bound} = \text{Delay bound} - \text{Jitter bond}/2$$
$$= 0.066667 - 0.053138/2$$
$$= 0.040098 \text{ s}$$

In order to match the transmission medium requirement, condition and constraint, the Medium Occupancy Specification is being adjusted according to report generated by Monitoring process. For example, due to bad channel condition Sender (Video camera in this case) can request for more bandwidth by sending a report indicating the value of Medium Occupancy duration Highest/Lowest Bound which is higher than the current value to AP (access point). Any QoS parameters can be used to report to perform such adjustment. Here, Adjustment is omitted for sake of simplicity.

Figure 13:
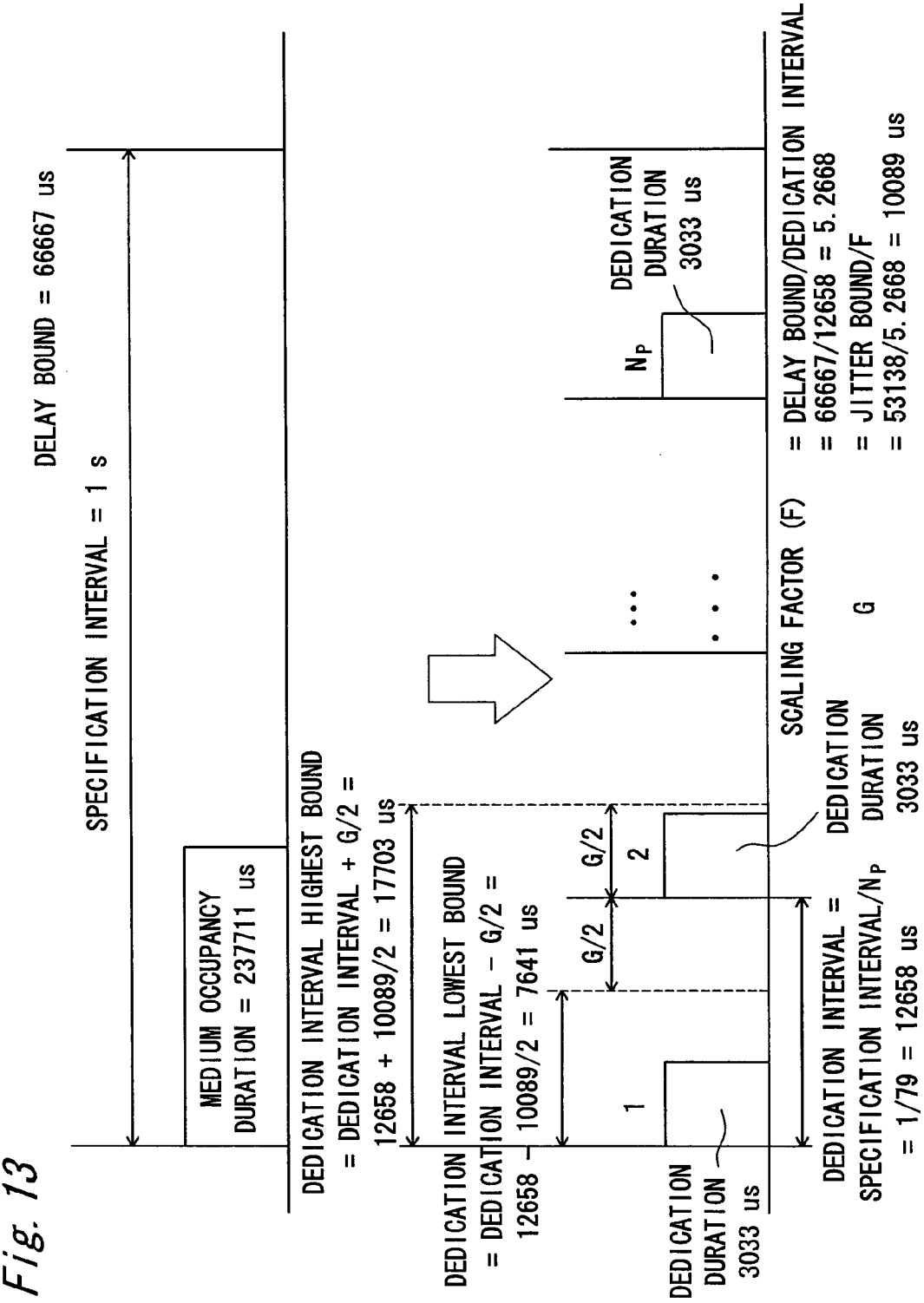
FIG. 13 is a schematic view of Medium Allocation and Dedication Interval.

Next, Medium allocation as shown in FIG. 13 is being performed. The Medium Occupancy Specification after allocation is shown in table 4.

TABLE 4

Allocated Medium Occupancy Specification for a SDTV

| Medium Occupancy Specification | Values |
|---|---|
| Medium Occupancy Duration Lowest Bound | 0.216101 s* |
| Medium Occupancy Duration Highest Bound | 0.237711 s* |
| Specification Duration Interval | 1 s |
| Dedication Interval Lowest Bound | 0.007614 s |
| Dedication Interval Highest Bound | 0.017703 s |

In this allocation process, Dedication Interval Highest/Lowest Bound is being determined. How to calculate Dedication Interval Highest/Lowest Bound as shown in Table 4 is described below.

Figure 11:
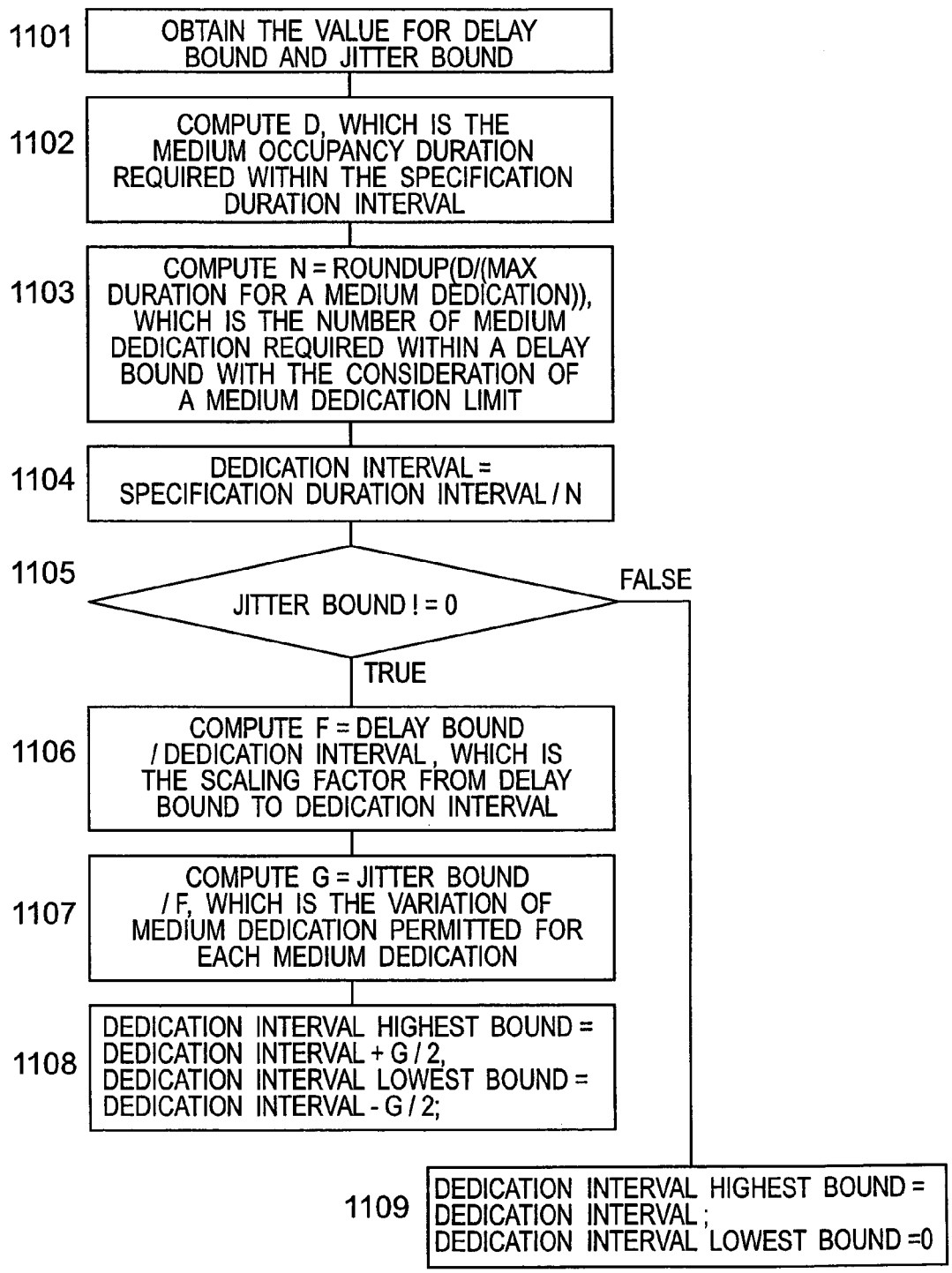
FIG. 11 is a flowchart for computing Dedication Interval Highest and Lowest Bound.

Please refer to FIG. 13 and FIG. 11. Because Delay bound, Jitter bound, Medium Occupancy Duration Required within the Specification Interval is being already determined, we can start from step 1103 as shown in FIG. 11. Here, we let medium dedication limit to be equal to time required to transmit a burst=3033 µs.

Number of Medium dedication required within Specification Interval (NP) = Medium Occupancy duration Highest bound/medium dedication limit (1103)

$$= 0.237711 / 0.003033$$
$$= 78.375$$
$$\approx 79$$

Dedication Interval = Specification Interval/NP (1104)
$$= 1/79$$
$$= 0.012658 \text{ s}$$

Scaling Factor (F) = Delay bound/Dedication Interval (1106)
$$= 0.066667/0.012658$$
$$= 5.2668$$

G = Jitter bound/F (1107)
$$= 0.053138/5.2668$$
$$= 0.010089 \text{ s}$$

According to this,

Dedication Interval Highest Bound = Dedication Interval + G/2 (1108)
$$= 0.012658 + 0.010089/2$$
$$= 0.017703 \text{ s}$$

Dedication Interval Lowest Bound = Dedication Interval − G/2 (1108)
$$= 0.012658 - 0.010089/2$$
$$= 0.007614 \text{ s}$$

Figure 14:
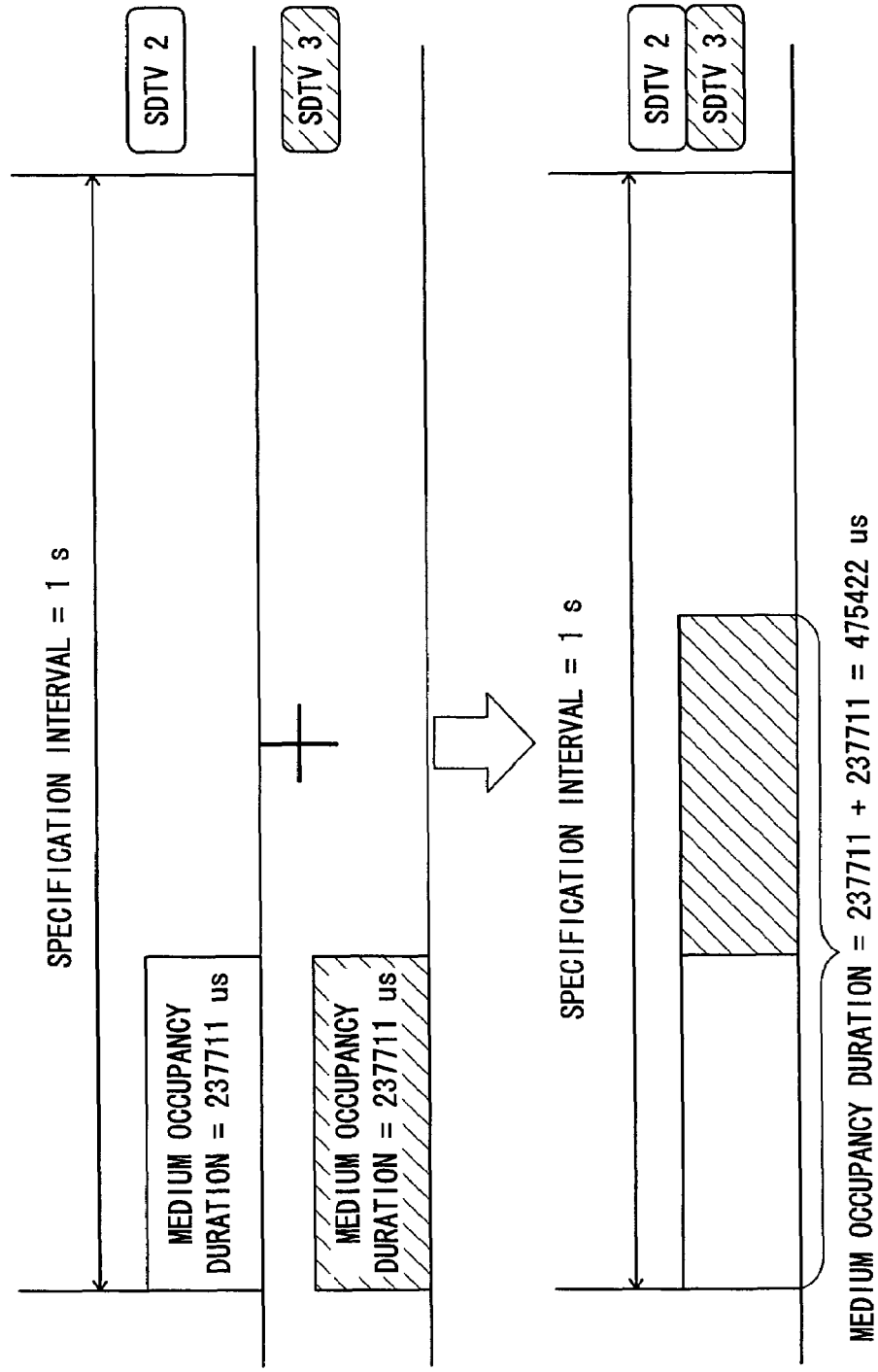
FIG. 14 is a schematic view of Aggregation.

Since SDTV 2 and SDTV 3 are source from the same device, aggregation as shown in FIG. 14 can be performed to reduce overhead. Aggregated medium occupancy specification for these two SDTV streams are shown in table 5.

TABLE 5

Aggregated Medium Occupancy Specification for SDTV 2 and SDTV 3

| Medium Occupancy Specification | Values |
|---|---|
| Medium Occupancy Duration Lowest Bound | 0.432202 s* |
| Medium Occupancy Duration Highest Bound | 0.475422 s* |

TABLE 5-continued

Aggregated Medium Occupancy Specification
for SDTV 2 and SDTV 3

| Medium Occupancy Specification | Values |
|---|---|
| Specification Duration Interval | 1 s |
| Dedication Interval Lowest Bound | 0.040097 s |
| Dedication Interval Highest Bound | 0.093236 s |

How to calculate each parameter as shown in Table 5 is described below. Please refer to FIG. 14. Aggregated Medium Occupancy Duration Highest/Lowest Bound is equal to sum of Medium Occupancy Duration Highest/Lowest Bound for each stream generated from a STA (504). In this example, the video camera needs to send 2 SDTV streams (SDTV2, SDTV3) and both stream has the same generic specification. Therefore, after Aggregation is being performed.

$$\begin{aligned}
\text{Medium Occupancy Duration} & \quad (504) \\
\text{Highest Bound} &= MOD \text{ Highest Bound } SDTV2 + \\
(MOD \text{ Highest Bound}) & \\
& \quad MOD \text{ Highest Bound } SDTV3 \\
&= 0.237711 + 0.237711 \\
&= 0.475422 \text{ s}
\end{aligned}$$

$$\begin{aligned}
\text{Medium Occupancy Duration} & \quad (504) \\
\text{Lowest Bound} &= MOD \text{ Lowest Bound } SDTV2 + \\
(MOD \text{ Lowest Bound}) & \\
& \quad MOD \text{ Lowest Bound } SDTV3 \\
&= 0.216101 + 0.216101 \\
&= 0.432202 \text{ s}
\end{aligned}$$

Dedication interval Highest/Lowest bound are equal to the minimum among all streams generated from the Video Camera. Because both stream has the same Dedication Interval Highest/Lowest Bound so after Aggregation is being performed.

$$\begin{aligned}
\text{Dedication Interval Highest} & \\
\text{bound } (DI \text{ Highest bound}) &= \text{Minimum}(DI \text{ Highest Bound } SDTV2, \\
& \quad DI \text{ Highest Bound } SDTV3) \\
&= \text{Minimum}(0.093236, 0.093236) \\
&= 0.093236 \text{ s}
\end{aligned}$$

$$\begin{aligned}
\text{Dedication Interval Lowest} & \\
\text{bound } (DI \text{ Lowest bound}) &= \text{Minimum}(DI \text{ Lowest Bound } SDTV2, \\
& \quad DI \text{ Lowest Bound } SDTV3) \\
&= \text{Minimum}(0.040097, 0.040097) \\
&= 0.040097 \text{ s}
\end{aligned}$$

After Aggregation is being performed, Dedication Interval Lowest/Highest Bound have to be recomputed again. Table 6 shows the Medium Occupancy Specification after allocation is being performed for the aggregated Medium Occupancy Specification.

TABLE 6

Allocated Aggregated Medium Occupancy
Specification for SDTV 2 and SDTV 3

| Medium Occupancy Specification | Values |
|---|---|
| Medium Occupancy Duration Lowest Bound | 0.432202 s* |
| Medium Occupancy Duration Highest Bound | 0.475422 s* |
| Specification Duration Interval | 1 s |
| Dedication Interval Lowest Bound | 0.003856 s |
| Dedication Interval Highest Bound | 0.008965 s |

Figure 15:
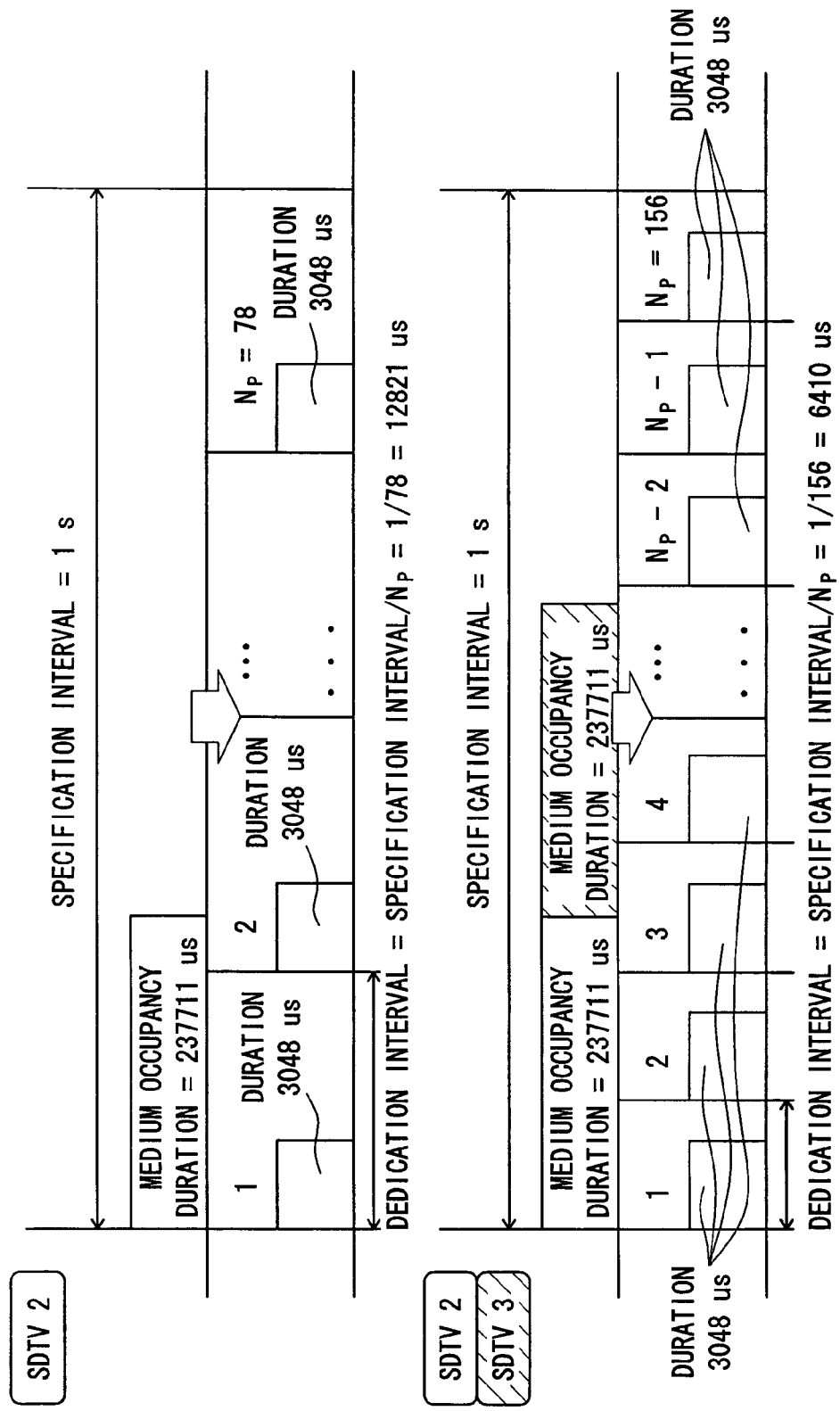
FIG. 15 is a schematic view of Dedication Interval after Aggregation.

How to calculate each parameter as shown in Table 6 is described below. Please refer to FIG. 15 and FIG. 5. First Number of Medium dedication required within Specification Interval (NP) is being determined in order to obtain Dedication Interval for the aggregated Medium Occupancy Specification. Here, we let medium dedication limit to be equal to time required to transmit a burst=3048 μs. The value for Medium dedication limit can be vendor dependent or actual limit on the medium.

$$\begin{aligned}
\text{Number of Medium dedication} & \quad (1103) \\
\text{required within} &= \text{Medium Occupancy duration} \\
\text{Specification Interval } (NP) & \\
& \quad \text{Highest bound/medium} \\
& \quad \text{dedication limit} \\
&= 0.475422 / 0.003048 \\
&= 155.9 \\
&\approx 156
\end{aligned}$$

Then Dedication Interval is being determined as below.

$$\begin{aligned}
\text{Dedication Interval} &= \text{Specification Interval}/NP \quad (1104) \\
&= 1/156 \\
&= 0.0065410 \text{ s}
\end{aligned}$$

Then Scaling Factor (F) and G is being determined as below. Here, Delay/Jitter bound should be the minimum delay/jitter bound among all the Medium Occupancy Specifications that are being aggregated.

$$\begin{aligned}
\text{Scaling Factor } (F) &= \text{Delay bound/Dedication Interval} \quad (1106) \\
&= 0.066667 / 0.006410 \\
&= 10.4
\end{aligned}$$

$$\begin{aligned}
G &= \text{Jitter bound}/F \quad (1107) \\
&= 0.053138/10.4 \\
&= 0.005109 \text{ s}
\end{aligned}$$

According to this, $$\text{Dedication Interval Highest Bound} = \text{Dedication Interval} + G/2 \quad (1108)$$
$$= 0.006410 + 0.005109/2$$
$$= 0.008965 \text{ s}$$

$$\text{Dedication Interval Lowest Bound} = \text{Dedication Interval} - G/2 \quad (1108)$$
$$= 0.006410 - 0.005109/2$$
$$= 0.003856 \text{ s}$$

Then these Medium Occupancy Specification are being sorted according to nominal dedication interval required.

Figure 16:
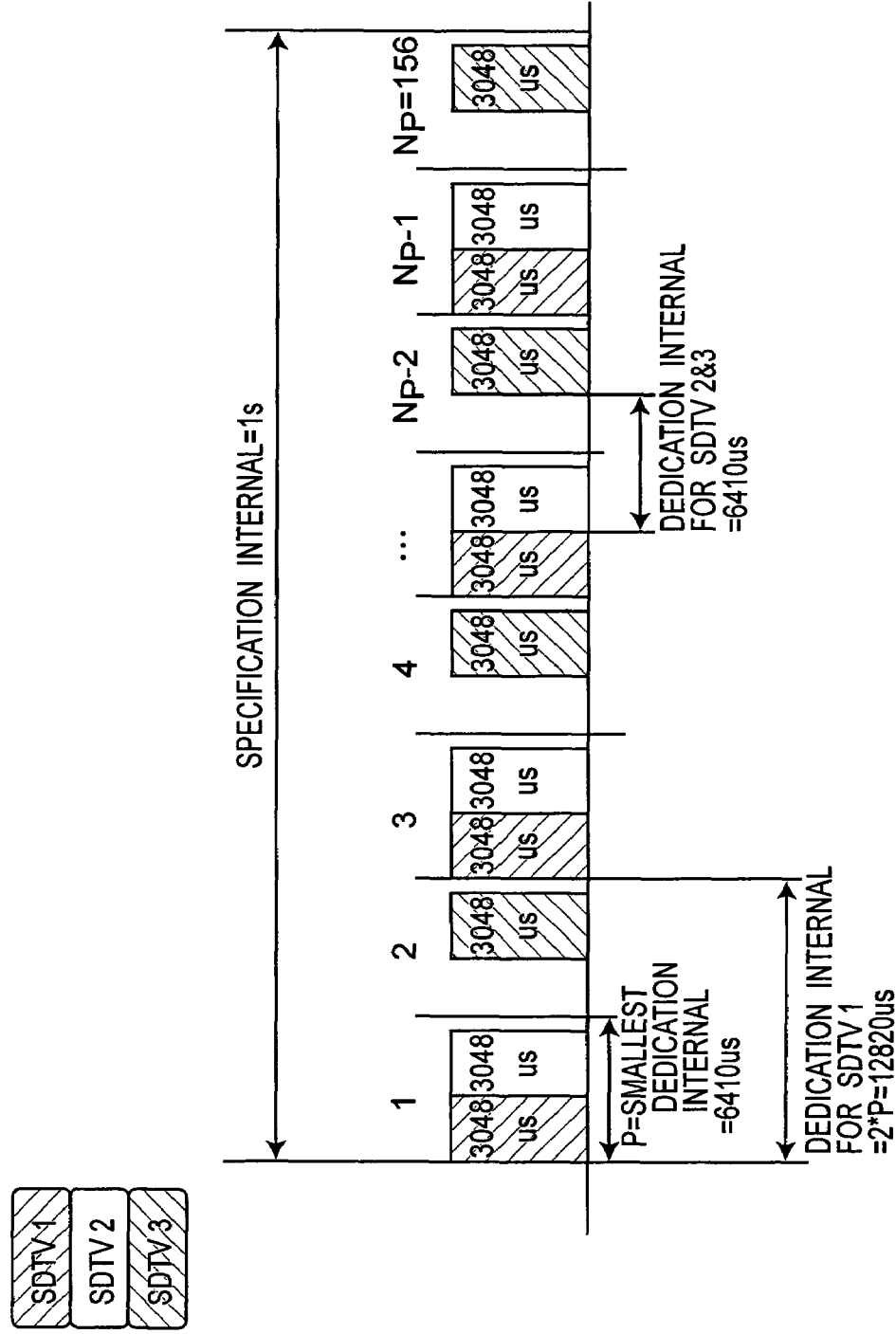
FIG. 16 is a schematic view of Medium Dedication Schedule.

In each generation of medium dedication schedule for a schedule period, the following variables are being computed:

a) Smallest medium dedication interval among all the Medium Occupancy Specification, P:
  i) Dedication Interval for the aggregated Medium Occupancy Specification for SDTV2 and SDTV3=$Ti^{SDTV2\&3}$=0.006410 s;
  ii) Dedication Interval for SDTV1=$Ti^{SDTV1}$=1/Round up (0.237711/0.003048)=0.012821 s;
  iii) Therefore, P=Minimum (0.006410, 0.012658)=0.006410 s.

b) Maximum number of medium dedication required, $N_{max}$:
  i) $N_{max}$=Round up (Specification Interval/P);
  ii) $N_{max}$=Round up (1/0.006410);
  iii) $N_{max}$=156.

c) Medium dedication start time for each Medium Occupancy Specification, Si:
  i) SDTV 1 is polled at the first order→$Si^{SDTV1}$=0 s;
  ii) SDTV 2 & 3 are polled at the second order→ $Si^{SDTV2\&3}$=$Si^{SDTV1}$+$Di^{SDTV1}$=0+0.003048=0.003048 s d) Number of medium dedication required for each Medium Occupancy Specification, Ni:

i) $Ni^{SDTV1}$ = Specification Interval/Dedication Interval for *SDTV1*
$$= 1/0.012821$$
$$= 78$$

ii) $Ni^{SDTV2\&3}$ = Specification Interval/Dedication Interval for *SDTV2 &3*
$$= 1/0.006410$$
$$= 156$$

e) Medium dedication duration of each dedication instance for each Medium Occupancy Specification, Di:
  i) Di for all Medium Occupancy Specifications are equal to a time required to transmit a burst=0.003048 s f) Medium Dedication Interval of each dedication instance for each Medium Occupancy Specification, Ti:
  i) Ti for SDTV2&3=P=0.006410 s
  ii) Ti for SDTV1
    (1) Dedication Interval Lowest Bound<Ti<Dedication Interval Highest Bound
    (2) 0.007614<Ti<0.017703 (Refer to Table 4)
    (3) Ti for SDTV1 should be divisible by P without remainder. This is because no overlapping will be occurred if this condition is satisfied.
    (4) Therefore, Ti is adjusted from 12821 μs to 12820 μs which is equal to 2*P
    (5) Ti for SDTV1=0.012820 s Table 7 shows an example set of values for this scenario. According to these values shown in Table 7, Medium Dedication Schedule for this scenario can be created as shown in FIG. 16.

TABLE 7

Parameters for creating Medium Dedication Schedule

| Variables | Values | |
|---|---|---|
| P | 0.006410 s | |
| Nmax | 156 | |
| | SDTV 1 | SDTV 2 & 3 |
| Si | 0 s | 0.003049 s |
| Ni | 78 | 156 |
| Di | 0.003048 s | 0.003048 s |
| Ti | 0.012820 | 0.006410 s |

Note that Ni for SDTV1 (78) is a half of Ni for SDTV2&3 (156) because the calculation is being based on the premise that Di (Medium Dedication Duration) for both SDTV1 and SDTV2&3 are equal to the same value 0.003048 s. If there is no constraints to fix Di=0.00348, Medium Dedication Schedule may also be simplified by recalculating all the parameters shown in Table 7 based on the premise that Ni (Number of Medium Dedication within Specification Interval) for both SDTV1 and SDTV2&3 are equal to $N_{max}$=156. In this case, Ti (Medium Dedication Interval) for all Medium Occupancy Specification will be equal to P=0.006410. Only Di for SDTV1 will be adjusted according to an increase of Ni for SDTV1 (78→156). Basically, Di for SDTV1 should be reduced by half because Ni is being doubled as below.

Di=0.003048/2=0.001524 s

However, because Medium dedication Duration of 0.003048 can accommodate a burst with 8 MSDUs, Di for SDTV1 should be reduced not by half but to the value that can accommodate a burst with 4 MSDUs in order to meet the Data rate requirement.

Time required to transmit a burst with 4 MSDUs=(4*356)+ 185=1609 μs

Therefore, Di for SDTV1 have to be fine adjusted to be more than 1609 μs.

Table 8 shows an example set of values required to create Medium Dedication Schedule when Dedication Interval for all Medium Occupancy Specifications are set to the smallest Medium Dedication Interval P=0.006410.

TABLE 8

Parameters for creating Medium Dedication Schedule when all Ti = P

| Variables | Values | |
|---|---|---|
| P | 0.006410 s | |
| Nmax | 156 | |
| | SDTV 1 | SDTV 2 & 3 |
| Si | 0 s | 0.001610 s |
| Ni | 156 | 156 |
| Di | 0.001609 s | 0.003048 s |
| Ti | 0.006410 | 0.006410 s |

Figure 17:
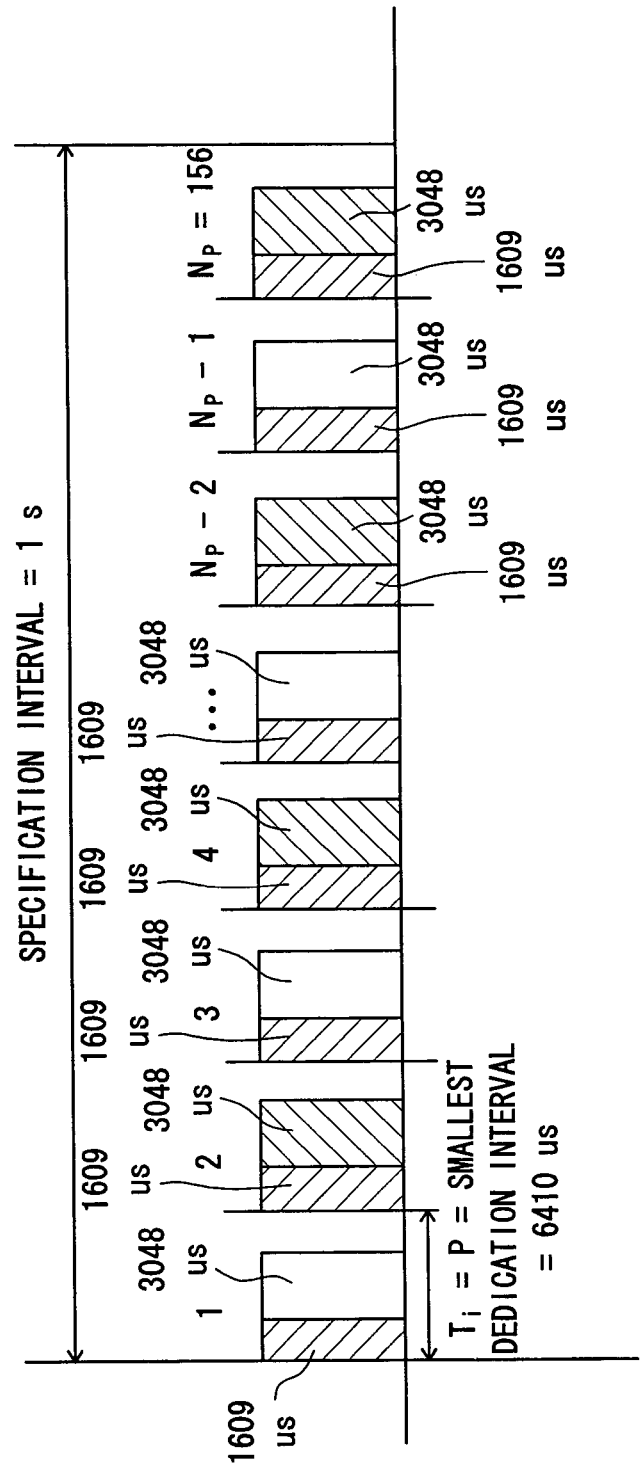
FIG. 17 is a schematic view of an alternative Medium Dedication Schedule.

According to these values shown in Table 7, an alternative Medium Dedication Schedule for this scenario can be created as shown in FIG. 17.

FIG. 18-FIG. 21 show an example of how transaction of the QoS information used for scheduling (such as Table2: Traffic requirement specification, Table 6: Medium Occupancy Specification, . . . etc.) is being performed in the wireless network. In these Figures, a transaction between the Video Camera (terminal 1) and the AP in order to schedule the SDTV3 stream which will be transmitted to the Home server (terminal 2) is being described.

First, a transaction for transformation process is being described.

Figure 18:
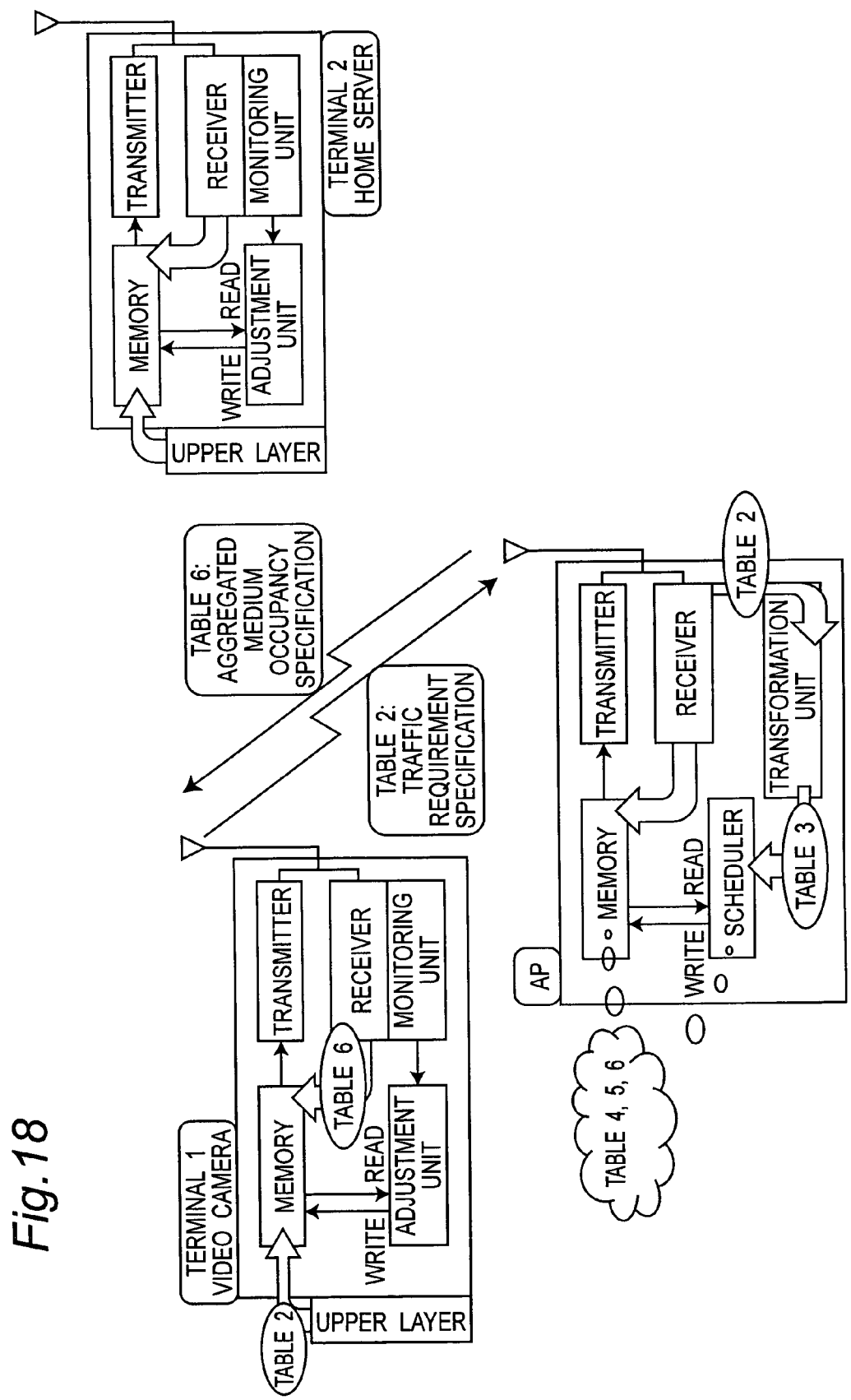
FIG. 18 is a schematic view of Transaction for Scheduling: Performing Conversion.

(Referring to FIG. 18)

In the terminal 1, Table 2 containing traffic requirement specification parameters (generic specification) of SDTV3 is being sent down from the upper layer. This table 2 is being registered into the memory of the terminal 1 before being sent to the AP. In the AP, This table 2 is being passed to the transformation unit. At the transformation unit, the table 2 is being transformed to the table 3 which contains Medium Occupancy Specification parameters for SDTV3 based on the calculation described above. Next, this table 3 is being passed to the scheduler unit and then to the AP memory. This table 3 is being registered into the memory once until Medium Occupancy Specification for all other streams are generated and registered into the memory. After that, table 4, 5, 6 is being generated considering Medium Occupancy Specification for other streams (in this case SDTV1, SDTV2) which are being registered in the AP memory. Then, Table 3, 4, 5, 6 are being registered into the AP memory. Table 6 is being sent back to the terminal 1 and registered into the memory unit of terminal 1 also as a reference information which will be used when monitoring and adjustment is being performed.

Figure 19:
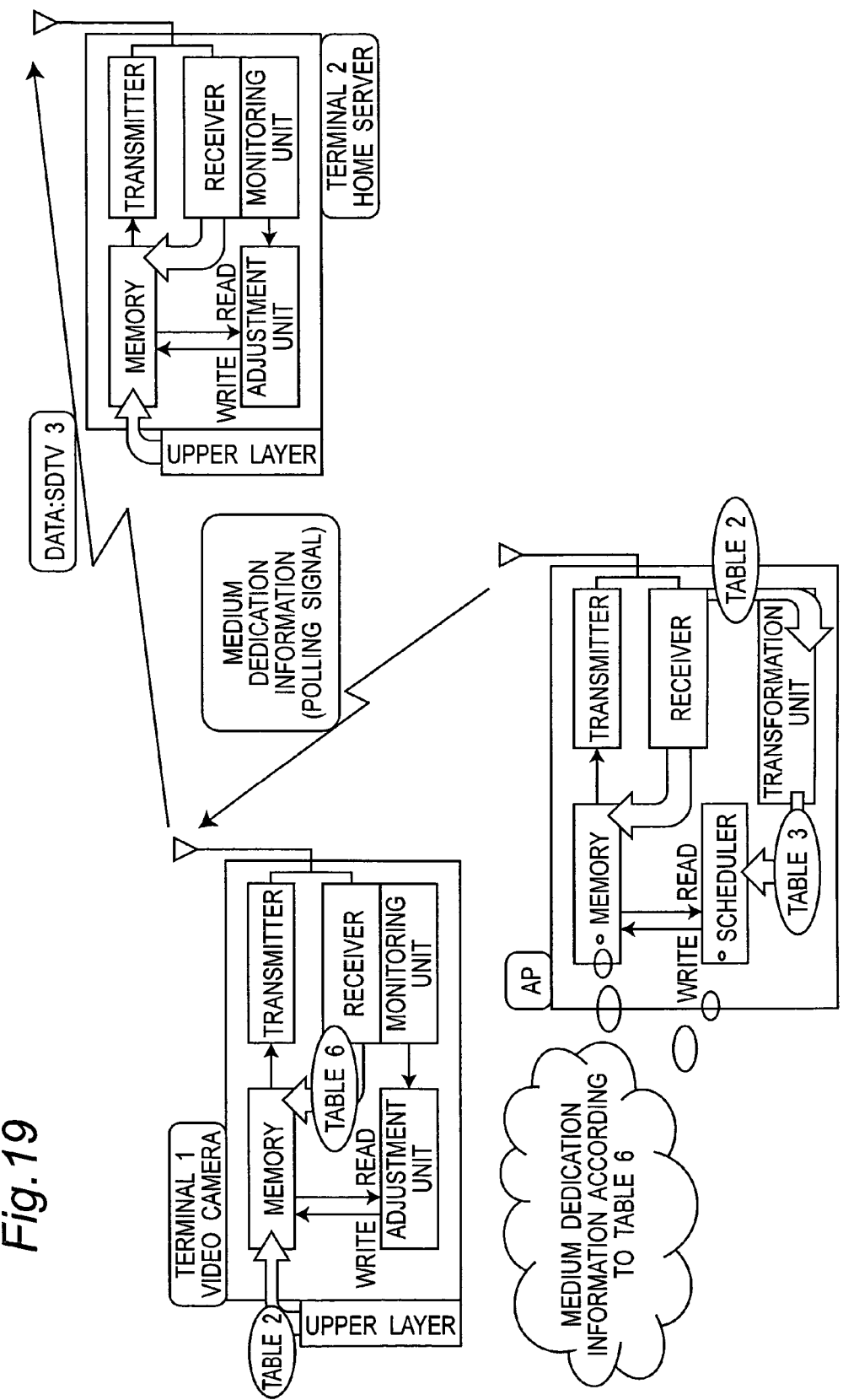
FIG. 19 is a schematic view of Transaction for Scheduling Performing Medium Dedication.

After the transformation process is finished, Medium Dedication Information for SDTV3 will be generated based on the information in Table 6 and Table 7, and transmitted to the terminal 1 every Dedication Interval as shown in FIG. 19. Basically, Medium Dedication Information is being contained in a Poll Frame which is sent from an AP to allow a corresponding terminal occupy the wireless channel for a specific time. When the terminal 1 receives such a Poll Frame, the terminal 1 will transmit SDTV3 data to the terminal 2 for a Medium Dedication Duration as indicated in the Poll frame.

Figure 20:
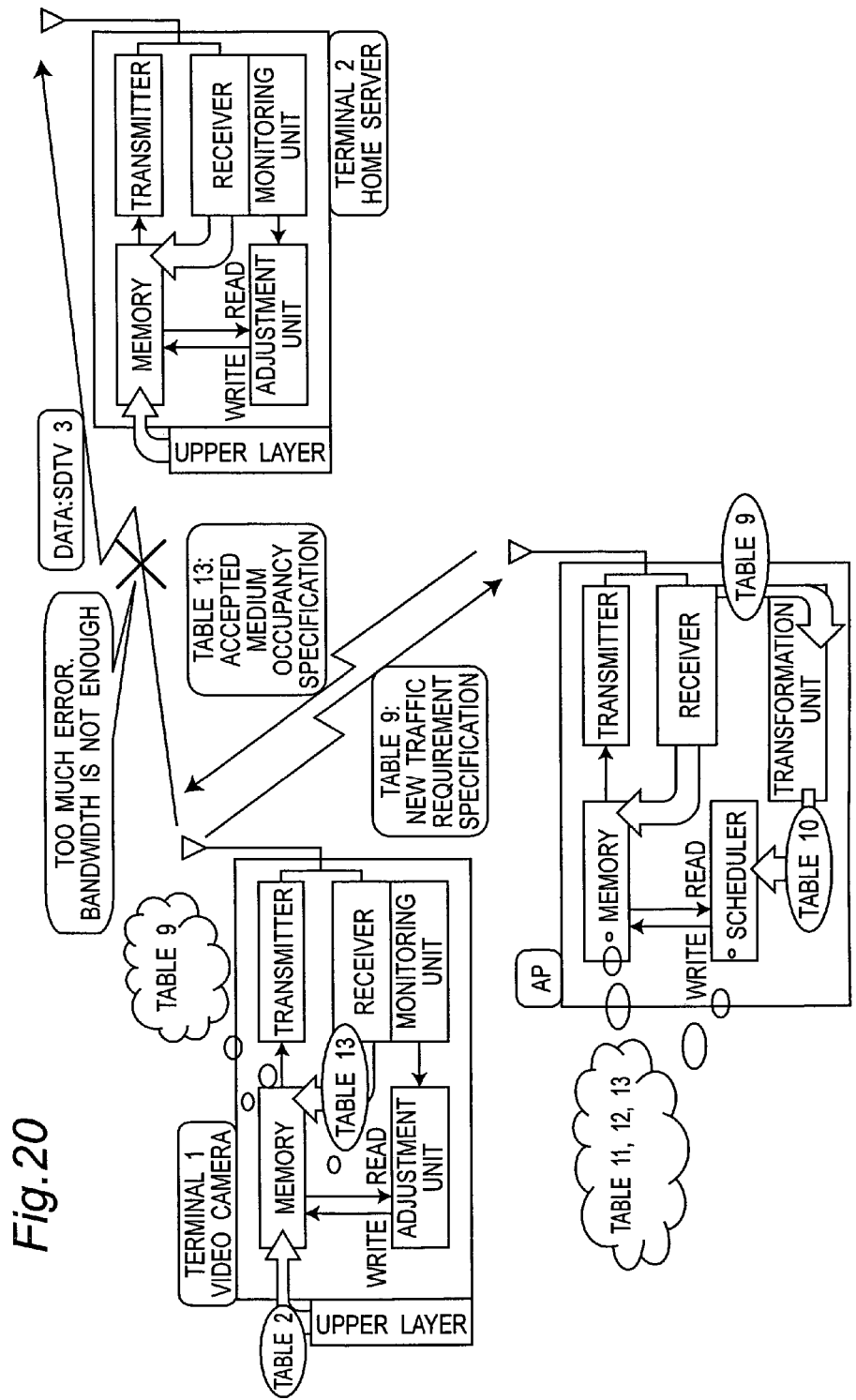
FIG. 20 is a schematic view of Transaction for Scheduling: Performing Monitoring and Adjustment with Transformation.

FIG. 20 show an example of Transaction when Monitoring and Adjustment is being performed in the case that Transformation is required. When the monitoring unit of terminal 1 found out that channel condition for SDTV3 stream is getting bad due to noise, shadowing and multipath fading, and a number of error packets increases over a threshold value (this situation implies that bandwidth currently allocated for SDTV3 stream would be inadequate because a number of packets needed to be transmitted increases), the adjustment unit of terminal 1 will adjust some Traffic Requirement Specification parameters indicated in the Table 2 and send the new Traffic Requirement Specification (Table 9) to the AP to request for more bandwidth as shown in FIG. 20. Table 9 shows a new Traffic Requirement Specification in the case that extra bandwidth of 10% is required to cope with bad channel condition.

In the AP, This table 9 is being transformed at the transformation unit and finally an accepted Medium Occupancy Specification as shown in Table 13 will be generated and send back to the terminal 1.

TABLE 9

New Generic Specification for SDTV3 stream

| Generic Specification Parameters | Values |
|---|---|
| Data Rate Lowest Bound | 6393120 bps + 10% = 7032432 bps |
| Data Rate Highest Bound | 7032432 bps + 10% = 7735675 bps |
| Nominal Data Size | 1402 bytes |
| Delay Bound | 66667 µs |
| Jitter Bound | 53138 µs |
| Transmission Rate | 36 Mbps |

TABLE 10

Medium Occupancy Specification for a SDTV

| Medium Occupancy Specification | Values |
|---|---|
| Medium Occupancy Duration Lowest Bound | 0.216101 s* + 10% = 0.237711 s |
| Medium Occupancy Duration Highest Bound | 0.237711* + 10% = 0.261482 s |
| Specification Duration Interval | 1 s |
| Dedication Interval Lowest Bound | 0.040098 s |
| Dedication Interval Highest Bound | 0.093236 s |

*Base on the transmission duration required to transmit 8 data packets in a burst, which is 3033 µs.

TABLE 11

Allocated Medium Occupancy Specification for a SDTV

| Medium Occupancy Specification | Values |
|---|---|
| Medium Occupancy Duration Lowest Bound | 0.216101 s* + 10% = 0.237711 s |
| Medium Occupancy Duration Highest Bound | 0.237711 * + 10% = 0.261482 s |
| Specification Duration Interval | 1 s |
| Dedication Interval Lowest Bound | 0.007614 s |
| Dedication Interval Highest Bound | 0.017703 s |

TABLE 12

Aggregated Medium Occupancy Specification for SDTV 2 and SDTV 3

| Medium Occupancy Specification | Values |
|---|---|
| Medium Occupancy Duration Lowest Bound | 0.432202 s* + 10% = 0.475422 s |
| Medium Occupancy Duration Highest Bound | 0.475422 * + 10% = 0.522964 s |
| Specification Duration Interval | 1 s |
| Dedication Interval Lowest Bound | 0.040098 s |
| Dedication Interval Highest Bound | 0.093236 s |

TABLE 13

Accepted Aggregated Medium Occupancy Specification for SDTV 2 and SDTV 3

| Medium Occupancy Specification | Values |
|---|---|
| Medium Occupancy Duration Lowest Bound | 0.432202 s* + 10% = 0.475422 s |
| Medium Occupancy Duration Highest Bound | 0.475422 s* + 10% = 0.522964 s |
| Specification Duration Interval | 1 s |

TABLE 13-continued

Accepted Aggregated Medium Occupancy Specification for SDTV 2 and SDTV 3

| Medium Occupancy Specification | Values |
|---|---|
| Dedication Interval Lowest Bound | 0.003856 s |
| Dedication Interval Highest Bound | 0.008965 s |

Figure 21:
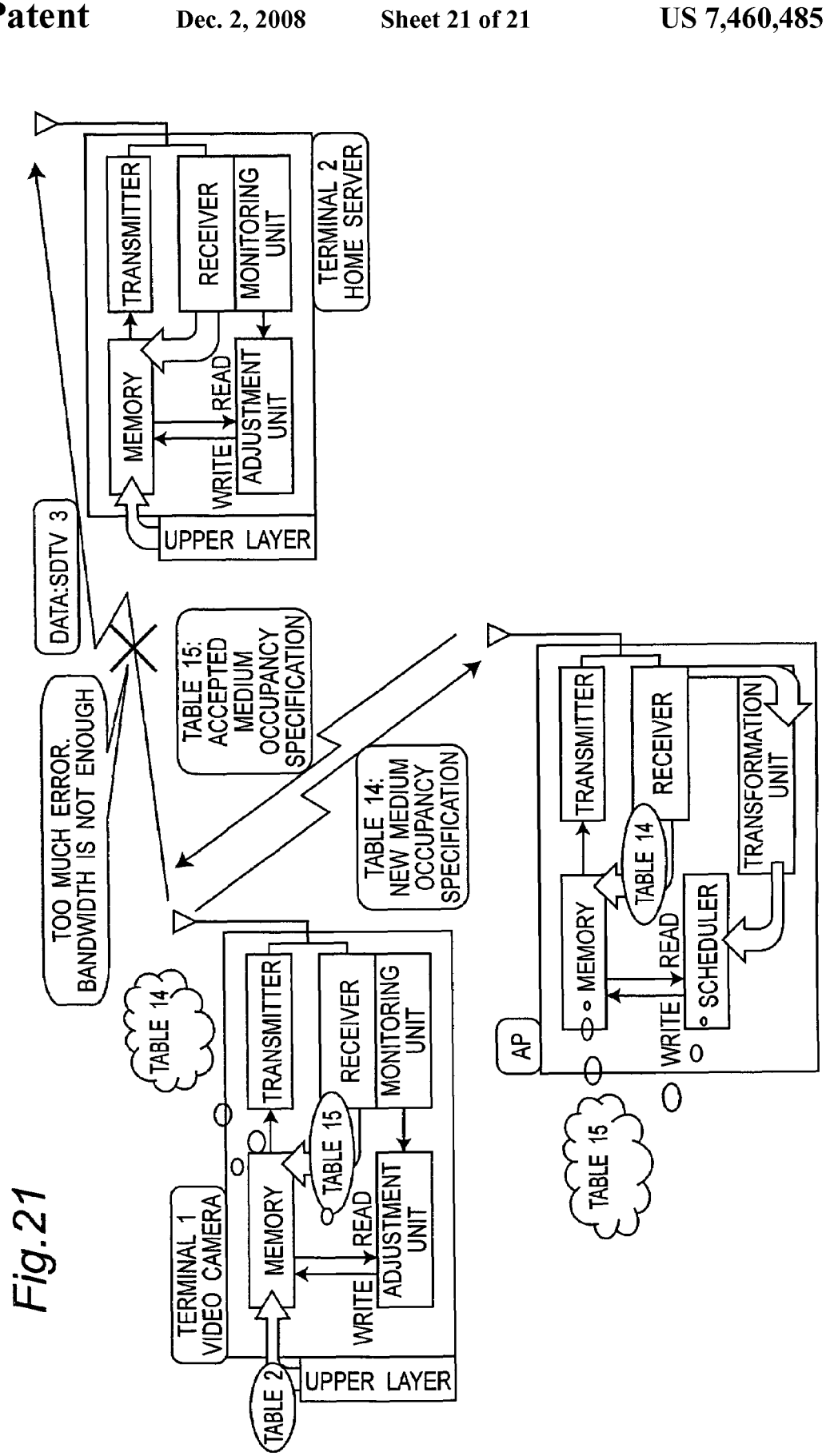
FIG. 21 is a schematic view of Transaction for Scheduling: Performing Monitoring and Adjustment without Transformation.

FIG. 21 show an example of Transaction when Monitoring and Adjustment is being performed in the case that no Transformation is required. In this case, instead of Traffic Requirement Specification, Medium Occupancy Specification for SDTV3 is being directly adjusted and sent to the AP so there's no need to perform transformation as shown in FIG. 21.

When the monitoring unit of terminal 1 found out that channel condition for SDTV3 stream is getting bad, the adjustment unit of terminal 1 will directly adjust some Medium Occupancy Specification parameters indicated in the Table 6 and send the new Medium Occupancy Specification (Table 14) to the AP to request for more bandwidth as shown in FIG. 21. Table 14 shows a new Medium Occupancy Specification in the case that extra bandwidth of 10% is required to cope with bad channel condition.

In the AP, This Table 14 is being checked by the scheduler whether it can be accepted or not. In this example, we assume that Medium Occupancy Specification as indicated in Table 14 is not acceptable. (Medium Occupancy Specification requested by a terminal may not be acceptable due to many reasons such as a shortage of bandwidth, no suitable schedule can be created, . . . etc.) In this case the AP may send back a Medium Occupancy Specification which is acceptable as shown in Table 15 to the terminal 1. If the terminal 1 can accept the Medium Occupancy Specification (Table 15) offered by the AP, it will send Table 15 back to the AP. If the terminal 1 can not accept the Medium Occupancy Specification (Table 15) offered by the AP, it may continue transmitting SDTV3 stream with the current Medium Occupancy Specification (Table 6), or stop transmitting for a while, or even restart the whole process again.

TABLE 14

New Aggregated Medium Occupancy Specification for SDTV 2 and SDTV 3

| Medium Occupancy Specification | Values |
|---|---|
| Medium Occupancy Duration Lowest Bound | 0.432202 s* + 10% = 0.475422 s |
| Medium Occupancy Duration Highest Bound | 0.475422 s* + 10% = 0.522964 s |
| Specification Duration Interval | 1 s |
| Dedication Interval Lowest Bound | 0.003856 s |
| Dedication Interval Highest Bound | 0.008965 s |

TABLE 15

Acceptable Aggregated Medium Occupancy Specification for SDTV 2 and SDTV 3.

| Medium Occupancy Specification | Values |
|---|---|
| Medium Occupancy Duration Lowest Bound | 0.432202 s* + 5% = 0.453812 s |
| Medium Occupancy Duration Highest Bound | 0.475422 s* + 5% = 0.499193 s |
| Specification Duration Interval | 1 s |

TABLE 15-continued

Acceptable Aggregated Medium Occupancy Specification for SDTV 2 and SDTV 3.

| Medium Occupancy Specification | Values |
|---|---|
| Dedication Interval Lowest Bound | 0.003856 s |
| Dedication Interval Highest Bound | 0.008965 s |

The invention can have the following structures viewed from various aspects. According to the first, a method for delivering real-time data across erroneous transmission medium for guaranteeing Quality of Service, the method comprising of:

(i) specifying the requirement of the traffic stream to a generic specification;

(ii) transforming the traffic requirement as specified in part (i) into another form of specification that with the consideration of requirement, overhead and condition of transmission medium;

(iii) adjusting the specification according to feedback status being monitored to best suit the transmission medium condition.

(iv) aggregating multiple traffic streams specification into a single specification in order to reduce resources required to maintain and process the specification as well as overhead incurred during medium dedication;

(v) generating medium dedication schedule according to specification; and (vi) performing medium dedication in order to coordinate transmission.

According to the second, a method according to claim 1, further includes after the performing medium dedication step (vi):

(vii) monitoring transmission medium in order to further tune the specification such that it is more reliable to be used by scheduler to generate medium dedication schedule in order to achieve the Quality of Service requirement of traffic stream.

According to the third, a method according to claim 1, wherein the generic specification for the traffic requirement and characteristics of real-time streaming application of the part (i) of claim 1 comprises of:

(i) highest and lowest bound of bandwidth required;

(ii) average data size in the unit of transmission;

(iii) lifetime of data unit;

(iv) variation permitted on the duration for data unit to reach destination entity; and (v) transmission rate used to deliver data unit.

According to the fourth, a method according to claim 1, wherein the generic specification for the traffic requirement and characteristics of real-time block transfer application of part (i) of claim 1 comprises of:

(i) highest and lowest bound of bandwidth required;

(ii) average data size in the unit of transmission;

(iii) lifetime of data unit; and (iv) transmission rate used to deliver data unit.

According to the fifth, a method according to claim 1, wherein the generic specification for the traffic requirement with the consideration of requirement, overhead and condition of transmission medium of part (ii) of claim 1 comprises of:

(i) highest and lowest bound of medium occupancy duration;

(ii) highest and lowest bound of dedication interval; and (iii) computation interval used for this specification.

According to the sixth, a method according to claim 5, further including a step of performing the transformation from the traffic requirement to obtain medium occupancy duration of part (i) of claim 5, the performing step comprising of:

(i) determining the size of the traffic to be transmitted within a duration interval;

(ii) determining the size of the traffic to be transmitted in each unit of transmission, which can be a single data packet transmission or a series of data packet to be transmitted in a burst;

(iii) determining the number of transmission unit required to transmit the size of traffic determine in part (i);

(iv) determining the duration required to complete a transmission unit. Multiply the result of part (iii) and part (iv).

According to the seventh, a method according to claim 6, further including a step of computing medium dedication interval for a specification, the computing step comprising of:

(i) computing the medium occupancy duration required within a duration interval;

(ii) determining the numbers of medium dedications are required within the duration interval with the consideration of medium dedication duration limit for an instance of medium dedication;

(iii) computing the division result of the duration interval over the number determined from part (ii).

According to the eighth, a method according to claim 7, further including a step of performing the transformation from traffic requirement to Dedication Interval Highest Bound of part (ii) of claim 5, the performing step comprising of:

(i) computing the Dedication Interval for the specification;

(ii) computing the scaling factor from Delay Bound to Dedication Interval;

(iii) adding the division of Jitter Bound that is scaled down by the factor as computed in part (ii) by 2 with the Dedication Interval as computed in part (i).

According to the ninth, a method according to claim 7, further including a step of performing the transformation from traffic requirement to Dedication Interval Lowest Bound of part (ii) of claim 5, the performing step comprising of:

(i) computing the Dedication Interval for the specification;

(ii) computing the scaling factor from Delay Bound to Dedication Interval;

(iii) if Jitter Bound is specified, subtracting the division of Jitter Bound that is scaled down by the factor as computed in part (ii) by 2 from the Dedication Interval as computed in part (i), else setting Dedication Interval Lowest to zero.

According to the tenth, a method according to claim 1, wherein the aggregating step of part (iv) of claim 1 comprises of:

(i) scaling each of the specifications to a same specification duration interval;

(ii) summing the corresponding parameters of the specification that are related to medium occupancy duration as the unified value;

(iii) selecting the smallest parameters of the specification that are related to dedication interval as the unified value.

According to the eleventh, a method according to claim 6, further including a step of generating an individual medium dedication schedule for each streams, the generating step comprising of:

(i) determining a schedule period;

(ii) determining a medium dedication start time;

(iii) determining a medium dedication duration required for each dedication instance;

(iv) computing the total medium dedication duration required within the schedule period;

(v) computing the number of medium dedication required within the schedule period, N, which is equal to the smallest integer value of the result as computed in part (iv) over the value as determined in part (iii);

(vi) computing the medium dedication interval, which is equal to schedule period over the value as computed in part (v);

(vii) creating N number of Medium dedication schedule structure base on the value obtained from parts (i), (iii) and (vi).

According to the twelfth, a method according to claim 11, wherein the Medium dedication schedule structure comprises of:

(i) identification of the device that this medium dedication is destined;

(ii) time value that this medium dedication is scheduled;

(iii) duration value that this medium dedication is allocated.

According to the thirteenth, a method according to claim 11, further including a step of generating an unified medium dedication schedule, the generating step comprising of:

(i) generating a initial medium dedication schedule for each Medium Occupancy Specification;

(ii) determining the smallest medium dedication interval among all medium dedication schedules;

(iii) determining the maximum number of medium dedication required, which is equal to the smallest non-prime integer value that is greater than the division result of the schedule period over the smallest medium dedication interval as identified in part (ii);

(iv) regenerating the medium dedication schedule which the number of medium dedication required with the schedule period is not a factor of the maximum number of medium dedication as identified in part (iii);

(v) merging individual medium dedication schedules into a unified medium dedication schedule.

According to the fourteenth, a method according to claim 13, wherein the merging step of part (v) of claim 13 comprises of:

(i) determining a medium dedication start time for the individual medium dedication schedule, where this start time and the end time of the first dedication, which is equal to medium dedication start time plus medium dedication duration, are not within the range of medium dedication time and medium dedication duration, which are elements of a Medium Dedication Schedule structure in the work-in-process unified medium dedication schedule;

(ii) updating the existing individual medium dedication schedule with the medium dedication start time as determined in part (i);

(iii) determining new values for the number of medium dedication required and medium dedication duration of parts (v) and (iii) of claim 10 correspondingly, if any medium dedication from part (ii) is collided with a medium dedication in work-in-process unified medium dedication schedule; and (iv) finalizing the individual medium dedication schedule and merge with work-in-process unified medium dedication schedule.

According to the fifteenth, a method according to claim 14, wherein the Medium dedication schedule structure comprises of:

(i) identification of the device that this medium dedication is destined;

(ii) time value that this medium dedication is scheduled;

(iii) duration value that this medium dedication is allocated.

According to the sixteenth, a method according to claim 14, wherein the determining step of part (iii) of claim 14 is the smallest factor of the maximum number of dedication of part (ii) of claim 13 that is greater than the old value.

According to the seventeenth, a method according to claim 1, wherein the performing step of part (vi) of claim 1 comprises of:

(i) generating medium dedication frame according to Medium Dedication Time; and (ii) inserting medium dedication frame into a specific FIFO queue, which the frame in this queue is to be transmitted before any frames in other queues.

According to the eighteenth, a method according to claim 2, wherein the monitoring step of part (vii) of claim 2 comprises of:

(i) monitoring the transmission medium condition; and (ii) reporting the transmission medium condition to the scheduling entity.

According to the nineteenth, Transmission medium condition being monitored and then reported to the scheduling entity, having any form of:

(i) medium Occupancy Specification;

(ii) parameters used to perform adjustment to existing Medium Occupancy Specification; and (iii) instantaneous request for extra medium dedication.

According to the twentieth, a method of fulfilling an instantaneous medium dedication request comprising of:

(i) using the time gap between each medium dedication; or (ii) using the remaining bandwidth that is being returned prematurely.

According to the twentieth-first, a method of monitoring a transmission medium condition comprising of:

(i) performing admission control for the admission of data from traffic stream with specification registered with coordinator to the specific transmission queue; and (ii) monitoring the status of the queue at the end of each medium dedication.

According to the twentieth-second, a method of reserving wireless medium bandwidth using the traffic requirement parameters as a means to describe the bandwidth required for the transport of data stream by the requesting entities residing at data stream transmitter and transmitted to the wireless medium coordinator, which is then being converted to a traffic stream parameters in order to obtain the amount of wireless medium time required for the delivery of the said data stream.

According to the twentieth-third, a method according to claim 22, wherein the traffic requirement parameters comprising of:

(i) highest and lowest bound of bandwidth required;

(ii) average data size in the unit of transmission;

(iii) lifetime of data unit;

(iv) variation permitted on the duration for data unit to reach destination entity; and (v) transmission rate used to deliver data unit.

According to the twentieth-fourth, a method according to claim 22, wherein the traffic stream parameters comprising of:

(i) highest and lowest bound of medium occupancy duration;

(ii) highest and lowest bound of dedication interval; and (iii) computation interval used for this specification.

According to the twentieth-fifth, a method of reserving wireless medium bandwidth using the traffic requirement parameters as a means to describe the bandwidth required for the transport of data stream by the requesting entities residing at data stream transmitter where the parameters are converted to a traffic stream parameters and transmitted in the format to the wireless medium coordinator indicating the amount of wireless medium time required for the delivery of the said data stream.

According to the twentieth-sixth, a method according to claim 25, wherein the traffic requirement parameters comprising of:

(i) highest and lowest bound of bandwidth required;

(ii) average data size in the unit of transmission;

(iii) lifetime of data unit;

(iv) variation permitted on the duration for data unit to reach destination entity; and (v) transmission rate used to deliver data unit.

According to the twentieth-seventh, a method according to claim 25, wherein the traffic stream parameters comprising of:

(i) highest and lowest bound of medium occupancy duration;

(ii) highest and lowest bound of dedication interval; and (iii) computation interval used for this specification.

Although the present invention has been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims, unless they depart therefrom.

The present disclosure relates to subject matter contained in priority Japanese Patent Application No. 2002-261481, filed on Sep. 6, 2002, the contents of which is herein expressly incorporated by reference in its entirety.

What is claimed is:

1. A method for guaranteeing a quality of service (QoS) in delivering real-time data across a transmission medium, comprising:

specifying a traffic requirement for a traffic stream in accordance with a generic first specification;

transforming the specified traffic requirement in accordance with a generic second specification based on the specified traffic requirement, an overhead requirement for the traffic stream and a condition of the transmission medium;

adjusting the generic second specification based on feedback obtained from monitoring the condition of the transmission medium;

aggregating a plurality of specifications for a plurality of traffic streams into a single specification to reduce resources required to maintain and process the plurality of specifications and overhead incurred in medium dedication;

generating a medium dedication schedule according to the single specification; and performing medium dedication in accordance with the medium dedication schedule to coordinate transmission of the plurality of traffic streams.

2. The method according to claim 1, further comprising:

monitoring, after performing medium dedication, the transmission medium to further tune the single specification to improve medium dedication scheduling and achieve a guaranteed quality of service for the plurality of traffic streams based on feedback obtained from monitoring the transmission medium.

3. The method according to claim 2, further comprising:

monitoring the condition of the transmission medium; and reporting the condition of the transmission medium to a scheduling entity.

4. The method according to claim 1,
wherein the generic first specification specifies traffic requirements and characteristics of real-time streaming applications, and
wherein the generic first specification specifies:
a highest bound and a lowest bound of bandwidth requirement;
an average data size in units of transmission;
a lifetime of a data unit;
a permitted variation on the duration for the data unit to reach a destination; and
a transmission rate used to deliver the data unit.

5. The method according to claim 1,
wherein the generic first specification specifies traffic requirements and characteristics of real-time block transfer applications, and
wherein the generic first specification specifies:
a highest bound and a lowest bound of bandwidth requirement;
an average data size in units of transmission;
a lifetime of a data unit; and
a transmission rate used to deliver the data unit.

6. The method according to claim 1,
wherein the generic second specification specifies:
a highest bound and a lowest bound of medium occupancy duration;
a highest bound and a lowest bound of dedication interval; and
a computation interval.

7. The method according to claim 1, further comprising:
generating a medium dedication frame according to a medium dedication time;
inserting the medium dedication frame into a first-in, first-out (FIFO) queue in a position to be transmitted prior to frames in other queues.

8. A method for guaranteeing a quality of service (QoS) in delivering real-time data across a transmission medium, comprising:
specifying a traffic requirement for a traffic stream in accordance with a generic first specification;
transforming the specified traffic requirement in accordance with a generic second specification based on the specified traffic requirement, an overhead requirement for the traffic stream and a condition of the transmission medium;
adjusting the generic second specification based on feedback obtained from monitoring the condition of the transmission medium;
aggregating a plurality of specifications for a plurality of traffic streams into a single specification to reduce resources required to maintain and process the plurality of specifications and overhead incurred in medium dedication;
generating a medium dedication schedule according to the single specification;
performing medium dedication in accordance with the medium dedication schedule to coordinate transmission of the plurality of traffic streams;
determining, in units of transmission, a number of units for an amount of traffic to be transmitted within a duration interval, as one of a single data packet transmission and a burst transmission of a series of data packets;
determining the duration required to transmit a unit of transmission; and
multiplying the determined number of units with the determined duration,
wherein the generic second specification specifies:
a highest bound and a lowest bound of medium occupancy duration;
a highest bound and a lowest bound of dedication interval; and
a computation interval.

9. The method according to claim 8, further comprising:
computing a medium occupancy duration required within a duration interval;
determining a number of medium dedications required within the duration interval in accordance with a medium dedication duration limit for an instance of medium dedication; and
dividing the duration interval by the determined number of medium dedications.

10. The method according to claim 9, further comprising:
computing a dedication interval for the generic second specification;
computing a scaling factor from a delay bound to the dedication interval;
scaling a jitter bound by the scaling factor;
dividing the scaled jitter bound in half; and
adding the dedication interval to the divided scaled jitter bound.

11. The method according to claim 9, further comprising:
computing a dedication interval for the generic second specification;
computing a scaling factor from a delay bound to the dedication interval;
scaling a jitter bound by the scaling factor, when the jitter bound is specified;
dividing the scaled jitter bound in half, when the jitter bound is specified; and
subtracting the divided jitter bound from the dedication interval, when the jitter bound is specified; and
setting the lowest bound of the dedication interval to zero, when the jitter bound is not specified.

12. The method according to claim 8, further comprising:
scaling each of the plurality of specifications for the plurality of traffic streams to a common specification duration interval;
summing corresponding medium occupancy duration parameters of each of the scaled plurality of specifications;
selecting a lowest dedication interval parameter from among the scaled plurality of specifications; and
specifying the single specification based on the summed corresponding medium occupancy duration parameters and the selected lowest dedication interval parameter.

13. The method according to claim 8, further comprising:
generating an individual medium dedication schedule for each of the plurality of traffic streams by:
determining a schedule period;
determining a medium dedication start time;
determining a medium dedication duration required for each instance of medium dedication;
computing a total medium dedication duration required during the schedule period;
computing N, a total number of medium dedication instances required during the schedule period, as N=Rounddown Int$\{T_{mdd}/M_{dd}\}$, $T_{mdd}$ being the total medium dedication duration required during the schedule period and $M_{dd}$ being the medium dedication duration required for each instance of medium dedication;

computing the medium dedication interval, $M_{DI}$, as $M_{DI}=N_p/N$, $N_p$ being the schedule period; and creating N data structures to store N individual medium dedication schedules.

14. The method according to claim 13,
wherein each of the N data structures comprise:
identification of a destination device for a scheduled medium dedication, a time value at which the medium dedication is scheduled to begin, and a duration value allocated for the medium dedication.

15. The method according to claim 13, further comprising:
determining a smallest medium dedication interval from among the N individual medium dedication schedules;
determining a maximum number of medium dedications required from among the N individual dedication schedules, the maximum number of medium dedications being equal to the smallest non-prime integer value that is greater than the schedule period divided by the smallest medium dedication interval;
regenerating the individual medium dedication schedules for which a number of medium dedications required during the schedule period is not a factor of the determined maximum number of medium dedications; and
merging the individual medium dedication schedules into a unified medium dedication schedule.

16. The method according to claim 15, wherein merging further comprises:
determining a medium dedication start time for each of the individual medium dedication schedules, wherein the medium dedication start time and a medium dedication end time equal to the sum of the medium dedication start time and medium dedication duration, are not within a range of a medium dedication time and a medium dedication duration of a medium dedication schedule structure for a work-in-process unified medium dedication schedule;

updating the individual medium dedication schedules with the medium dedication start time;

determining a new value for the total number of required medium dedications and the determined medium dedication duration;

determining a maximum number of required medium dedications, the maximum number of required medium dedications being equal to the smallest non-prime integer value that is greater than the schedule period divided by the smallest medium dedication interval; and merging the individual medium dedication schedule with the work-in-process unified medium dedication schedule.

17. The method according to claim 16,
wherein the medium dedication schedule structure comprises identification of a destination device for a medium dedication scheduled by the individual medium dedication schedule, a time value at which the medium dedication is scheduled to begin, and a duration value allocated to the medium dedication.

18. The method according to claim 16,
wherein the determined new value of medium dedication duration corresponds to the smallest medium dedication interval among all medium dedication schedules greater than a previous value of medium dedication interval.

* * * * *